US012024416B2

(12) United States Patent
Vermeulen et al.

(10) Patent No.: US 12,024,416 B2
(45) Date of Patent: Jul. 2, 2024

(54) BEVERAGE INFUSION APPARATUS AND METHOD FOR INFUSING GAS INTO A BEVERAGE

(71) Applicant: TechFit Inc., Asheboro, NC (US)

(72) Inventors: Derek Vermeulen, La Grange, NC (US); William Bostic, Asheboro, NC (US)

(73) Assignee: TechFit Inc., Asheboro, NC (US)

( * ) Notice: Subject to any disclaimer, the term of this patent is extended or adjusted under 35 U.S.C. 154(b) by 0 days.

(21) Appl. No.: 18/132,668

(22) Filed: Apr. 10, 2023

(65) Prior Publication Data

US 2024/0043260 A1 Feb. 8, 2024

Related U.S. Application Data

(63) Continuation of application No. 17/579,027, filed on Jan. 19, 2022, now Pat. No. 11,649,152, which is a (Continued)

(51) Int. Cl.
*B67D 1/00* (2006.01)
*B67D 1/08* (2006.01)
(Continued)

(52) U.S. Cl.
CPC ......... *B67D 1/0023* (2013.01); *B67D 1/0045* (2013.01); *B67D 1/0888* (2013.01);
(Continued)

(58) Field of Classification Search
CPC .. B67D 1/0023; B67D 1/0045; B67D 1/0888; B67D 1/108; B67D 1/1206;
(Continued)

(56) References Cited

U.S. PATENT DOCUMENTS 1,561,036 A * 11/1925 Sugden ............... B01F 23/2362 141/273
2,170,531 A * 8/1939 Kahn .................... A47J 43/128 366/182.1

(Continued)

FOREIGN PATENT DOCUMENTS

CA 1282023 3/1991
CA 2045319 12/1991

(Continued)

*Primary Examiner* — Donnell A Long
(74) *Attorney, Agent, or Firm* — Merchant & Gould P.C.

(57) ABSTRACT

A beverage infusion apparatus includes: beverage infusion apparatus comprising: (a) an infusion module for infusing a nitrogen containing gas into a beverage to form a gas infused beverage, wherein: (i) the infusion module comprises a gas draw venturi device for drawing the nitrogen containing gas into the beverage as a result of flow of the beverage through the gas draw venturi device to form the gas infused beverage; (b) a dispensing valve for dispensing the gas infused beverage and constructed to move between an open position and a closed position, wherein: (i) the open position permits dispensing of the gas infused beverage from the beverage infusion apparatus; (ii) the closed position prevents dispensing of the gas infused beverage from the beverage infusion apparatus; and (iii) the dispensing valve is constructed to move between the open position and the closed position by a user of the beverage infusion apparatus; and (c) a pump constructed to move the beverage, under pressure, from a beverage reservoir, through the dispensing valve to the dispensing valve. A method of forming a gas infused beverage at a location of purchase of the gas infused beverage is provided.

26 Claims, 17 Drawing Sheets

Related U.S. Application Data continuation-in-part of application No. 17/358,816, filed on Jun. 25, 2021, now Pat. No. 11,649,153.

(60) Provisional application No. 63/169,605, filed on Apr. 1, 2021, provisional application No. 63/044,064, filed on Jun. 25, 2020.

(51) Int. Cl.
*B67D 1/10* (2006.01)
*B67D 1/12* (2006.01)
*B67D 1/14* (2006.01)

(52) U.S. Cl.
CPC ........... *B67D 1/108* (2013.01); *B67D 1/1206* (2013.01); *B67D 1/1247* (2013.01); *B67D 1/1252* (2013.01); *B67D 1/1275* (2013.01); *B67D 1/1293* (2013.01); *B67D 1/14* (2013.01)

(58) Field of Classification Search
CPC .. B67D 1/1247; B67D 1/1252; B67D 1/1275; B67D 1/1293; B67D 1/14
See application file for complete search history.

(56) References Cited

U.S. PATENT DOCUMENTS

| | | | | | |
|---|---|---|---|---|---|
| 3,397,871 | A | * | 8/1968 | Hasselberg | B01F 25/3132 261/DIG. 7 |
| 3,728,129 | A | | 4/1973 | Sargeant | |
| 3,881,636 | A | | 5/1975 | D'Aubreby | |
| 4,028,441 | A | | 6/1977 | Richards | |
| 4,305,382 | A | | 12/1981 | Nott | |
| 4,323,090 | A | * | 4/1982 | Magi | B01F 23/2361 261/DIG. 7 |
| 4,364,493 | A | * | 12/1982 | Raynes | B67D 1/1252 251/364 |
| 4,481,986 | A | * | 11/1984 | Meyers | B01F 23/2361 261/DIG. 7 |
| 4,518,541 | A | * | 5/1985 | Harris | B01F 23/2362 261/DIG. 7 |
| 4,708,827 | A | * | 11/1987 | McMillin | B67D 1/0075 261/DIG. 7 |
| 4,709,625 | A | * | 12/1987 | Layre | A47J 31/18 99/289 R |
| 4,742,942 | A | | 5/1988 | Dokes et al. | |
| 4,852,473 | A | | 8/1989 | Azpitarte | |
| 4,869,396 | A | * | 9/1989 | Horino | B67D 1/1252 222/61 |
| 5,207,148 | A | | 5/1993 | Anderson et al. | |
| 5,265,520 | A | | 11/1993 | Giuliano | |
| 5,335,588 | A | | 9/1994 | Mahlich | |
| 5,473,972 | A | | 12/1995 | Rizzuto et al. | |
| 5,509,349 | A | | 4/1996 | Anderson et al. | |
| 5,738,002 | A | | 4/1998 | Marano-Ducarne | |
| 5,842,600 | A | | 12/1998 | Singleterry et al. | |
| 6,183,800 | B1 | | 2/2001 | van Straten et al. | |
| 6,443,335 | B1 | | 9/2002 | Pinedjian et al. | |
| 7,021,206 | B2 | | 4/2006 | Eckenhausen et al. | |
| 7,252,034 | B1 | | 8/2007 | Eckenhausen et al. | |
| 7,507,430 | B2 | | 3/2009 | Stearns et al. | |
| 8,367,133 | B2 | | 2/2013 | Keller | |
| 8,383,181 | B2 | | 2/2013 | Daburger et al. | |
| 8,962,053 | B2 | | 2/2015 | Carbonini | |
| 9,623,383 | B1 | | 4/2017 | Kleinrichert | |
| 9,661,966 | B2 | | 5/2017 | Park et al. | |
| 9,955,710 | B2 | | 5/2018 | Hyde et al. | |
| 10,477,883 | B2 | | 11/2019 | Giardino et al. | |
| 10,618,793 | B2 | | 4/2020 | Touchette | |
| 10,625,219 | B2 | | 4/2020 | Bandixen et al. | |
| 10,730,023 | B2 | | 8/2020 | Hyde | |
| 10,785,996 | B2 | | 9/2020 | Giardino et al. | |
| 11,192,073 | B2 | | 12/2021 | Hofius et al. | |
| 11,661,330 | B2 | | 5/2023 | Vandekerckhove et al. | |
| 2010/0199851 | A1 | | 8/2010 | Fuenten | |
| 2011/0311694 | A1 | | 12/2011 | Broennimann | |
| 2015/0007900 | A1 | | 1/2015 | Li | |
| 2016/0051083 | A1 | | 2/2016 | Turi | |
| 2016/0175783 | A1 | | 6/2016 | Jarrousse et al. | |
| 2016/0175785 | A1 | | 6/2016 | Li et al. | |
| 2017/0055552 | A1 | | 3/2017 | Giardino et al. | |
| 2018/0236417 | A1 | | 8/2018 | Borders | |
| 2020/0017349 | A1 | | 1/2020 | Bissen et al. | |
| 2020/0122994 | A1 | | 4/2020 | Cimatti et al. | |
| 2020/0207603 | A1 | | 7/2020 | Sevcik | |
| 2021/0022545 | A1 | | 1/2021 | Romano et al. | |
| 2021/0094004 | A1 | | 4/2021 | Humphrey et al. | |
| 2022/0017348 | A1 | | 1/2022 | Vermeulen et al. | |
| 2022/0185647 | A1 | | 6/2022 | Arafeh et al. | |
| 2022/0234877 | A1 | | 7/2022 | Vermeulen et al. | |

FOREIGN PATENT DOCUMENTS

| | | | |
|---|---|---|---|
| DE | 202012009076 | U1 | 11/2012 |
| EP | 2583596 | A1 | 4/2013 |
| EP | 2798988 | A1 | 11/2014 |
| EP | 2987435 | A1 | 2/2016 |
| FR | 3012123 | | 10/2013 |

* cited by examiner

BEVERAGE INFUSION APPARATUS AND METHOD FOR INFUSING GAS INTO A BEVERAGE

The present disclosure is a continuation of U.S. application Ser. No. 17/579,027, filed on Jan. 19, 2022, now U.S. Pat. No. 11,649,152. U.S. application Ser. No. 17/579,027 is a continuation in part of U.S. application Ser. No. 17/358,816, filed on Jun. 25, 2021, now U.S. Pat. No. 11,649,153. This application claims priority, to the extent appropriate, to U.S. Provisional Application Ser. No. 63/044,064, filed on Jun. 25, 2020, and U.S. Provisional Application Ser. No. 63/169,605, filed on Apr. 1, 2021. The disclosures of U.S. application Ser. Nos. 17/579,027, 17/358,816, 63/044,064, and 63/169,605 are incorporated herein by reference in their entirety.

FIELD OF THE DISCLOSURE

The present disclosure relates to an apparatus and method for infusing a liquid, such as a beverage, with a gas, such as nitrogen, and dispensing the gas infused beverage for consumption.

BACKGROUND

Nitrogen has been used to enhance the flavor and texture of a variety of beverages, such as, beers. Various techniques for introducing nitrogen into beverages are available. For example, brewers of beer have dissolved nitrogen in the beer in a keg. The combination provides a high-quality presentation in the form of a stable foam head because nitrogen is weakly soluble in an aqueous composition. When nitrogen has been pre-dissolved at elevated pressure, nitrogen will rapidly precipitate out of solution when the beer flows through a dispensing tap. This precipitation is in the form of a very fine dispersion of small bubbles which float slowly to the surface of the beer. These bubbles are relatively stable because the nitrogen is generally unable to permeate through the bubble wall resulting in a “head” on a nitrogenated beer that lasts longer and is more appealing to consumers.

In addition to nitrogenating a beverage, such as beer, during production, attempts have been made to introduce nitrogen into a beverage during a dispensing operation. These attempts have been criticized for various reasons. One reason is a risk of bacterial growth in small orifices exposed to the beverage. Such bacterial growth can lead to the contamination of a beverage to be consumed by a person. Effective cleaning of these orifices is difficult. Another reason is that such systems have also been criticized because they do not allow for sufficient control of the amount of nitrogen which may or may not dissolve in the beverage to provide a consistent product. Another reason is that infusing nitrogen, under pressure, into a beverage is difficult to control for providing a consistent and reproducible infused beverage product.

The present disclosure addresses these drawbacks, and provides an apparatus and method for infusing a liquid, such as a beverage, with a gas, such as nitrogen, and dispensing the gas infused beverage for consumption.

SUMMARY

A beverage infusion apparatus is described by the present disclosure. The beverage infusion apparatus includes: (a) an infusion module for infusing a nitrogen containing gas into a beverage to form a gas infused beverage, wherein: (i) the infusion module comprises a gas draw venturi device for drawing the nitrogen containing gas into the beverage as a result of flow of the beverage through the gas draw venturi device to form the gas infused beverage; (b) a dispensing valve for dispensing the gas infused beverage and constructed to move between an open position and a closed position, wherein: (i) the open position permits dispensing of the gas infused beverage from the beverage infusion apparatus; (ii) the closed position prevents dispensing of the gas infused beverage from the beverage infusion apparatus; and (iii) the dispensing valve is constructed to move between the open position and the closed position by a user of the beverage infusion apparatus; and (c) a pump constructed to move the beverage, under pressure, from a beverage reservoir, through the dispensing valve to the dispensing valve.

A method of forming a gas infused beverage at a location of purchase of the gas infused beverage is described by the present disclosure. The method includes: (a) infusing a nitrogen containing gas into a beverage to form a gas infused beverage, wherein the beverage flows through a gas draw venturi and draws the nitrogen containing gas into the beverage to form the gas infused beverage, wherein: (i) the beverage flows at a flow rate of about 0.5 ounce/second to about 3 ounce/second to the gas draw venturi; (b) dispensing the gas infused beverage by moving a dispensing valve from a closed position to an open position, wherein: (i) the open position permits dispensing of the gas infused beverage; and (ii) the closed position prevents dispensing of the gas infused beverage; and (c) delivering the nitrogen containing gas, at atmospheric pressure, to the gas draw venturi, wherein the nitrogen containing gas comprises at least 10% oxygen.

DETAILED DESCRIPTION

This disclosure relates to a beverage infusion apparatus and to a method of infusing a gas into a beverage, at the location of use and/or purchase, that provides a consistent and reproducible beverage product. In general, it is expected that a user of the beverage infusion apparatus and the method of infusing a gas into a beverage will utilize the apparatus and/or method to prepare a beverage product having desired taste and texture properties, and that the taste and texture properties of the beverage can be consistently reproduced. Furthermore, the disclosure relates to a beverage infusion apparatus and to a method of cleaning the beverage infusion apparatus.

The reference to "location of use" or "location of purchase" indicates that the resulting gas infused beverage is produced on site where it is delivered to the consumer or purchaser immediately after production and for immediate consumption. It should be appreciated that immediate consumption means that the gas infused beverage is intended to be consumed directly after dispensing rather, and at the consumer's leisure as opposed be being bottled for storage and later consumption. For example, the consumer or a worker may activate the beverage infusion apparatus that causes the nitrogen containing gas to become infused into the beverage thereby forming the nitrogen gas infused beverage for consumption by the consumer. In the case of a coffee or tea store that serves fresh coffee or tea, it is expected that a worker, such as an employee, will prepare the nitrogen gas infused beverage using the beverage infusion apparatus, and then hand the nitrogen gas infused beverage to the consumer in a cup or container for consumption. In a self-serve store, such as those types of stores generally referred to as "convenience stores," the consumer may activate the beverage infusion apparatus and cause the production of the nitrogen gas infused beverage into a cup or container for consumption. The reference to a "retail facility" indicates a store where the gas infused beverage is prepared and sold and possibly consumed. It is noted that the consumer may take the purchased gas infused beverage away from the store or on the go. Exemplary retail facilities include cafes, coffee shops, tea shops, convenience stores, cafeterias, restaurants, etc.

Figure 1:
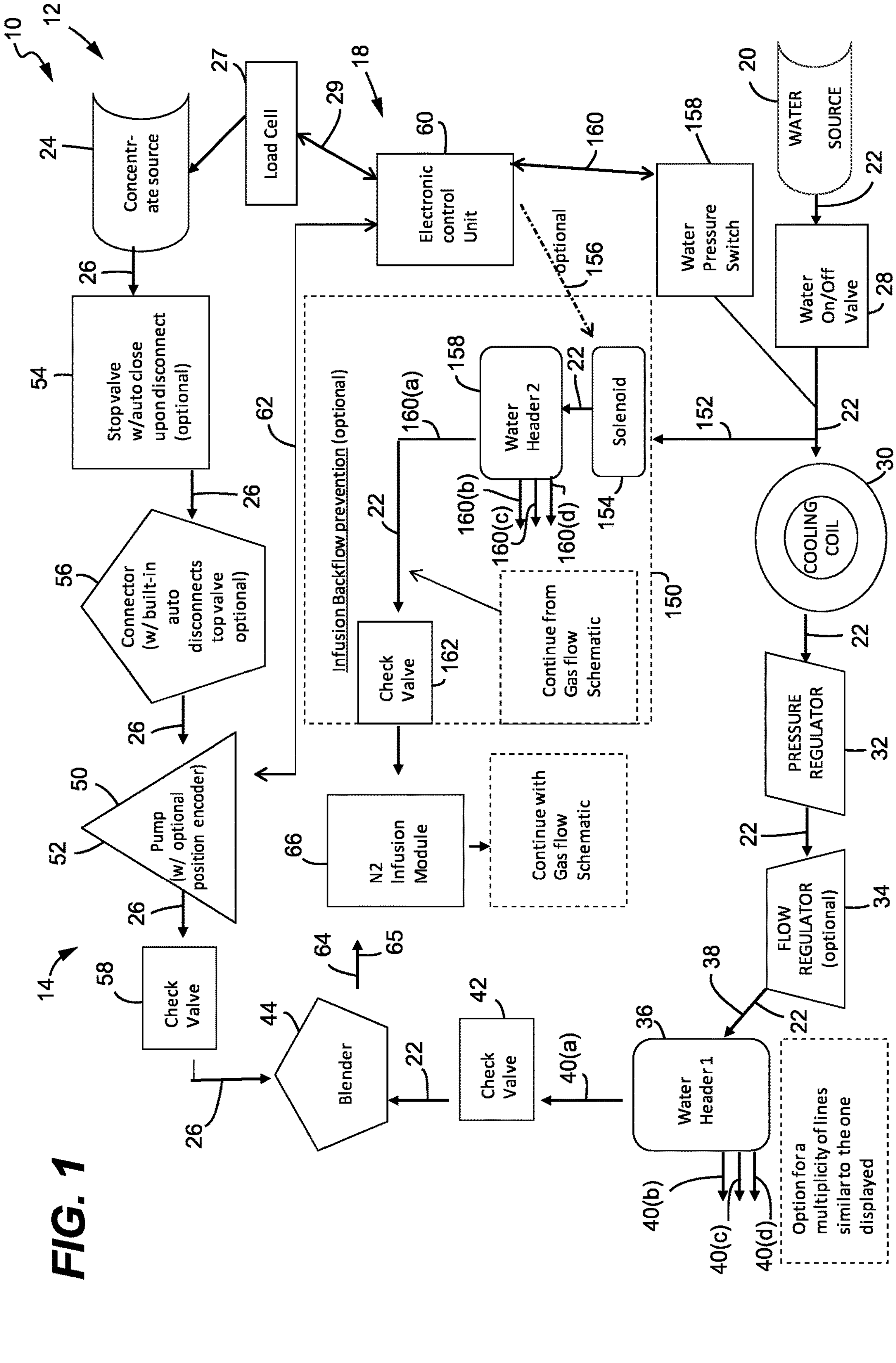
FIG. 1 is a schematic representation illustrating fluid flow through the beverage infusion apparatus according to the present disclosure.
Figure 2:
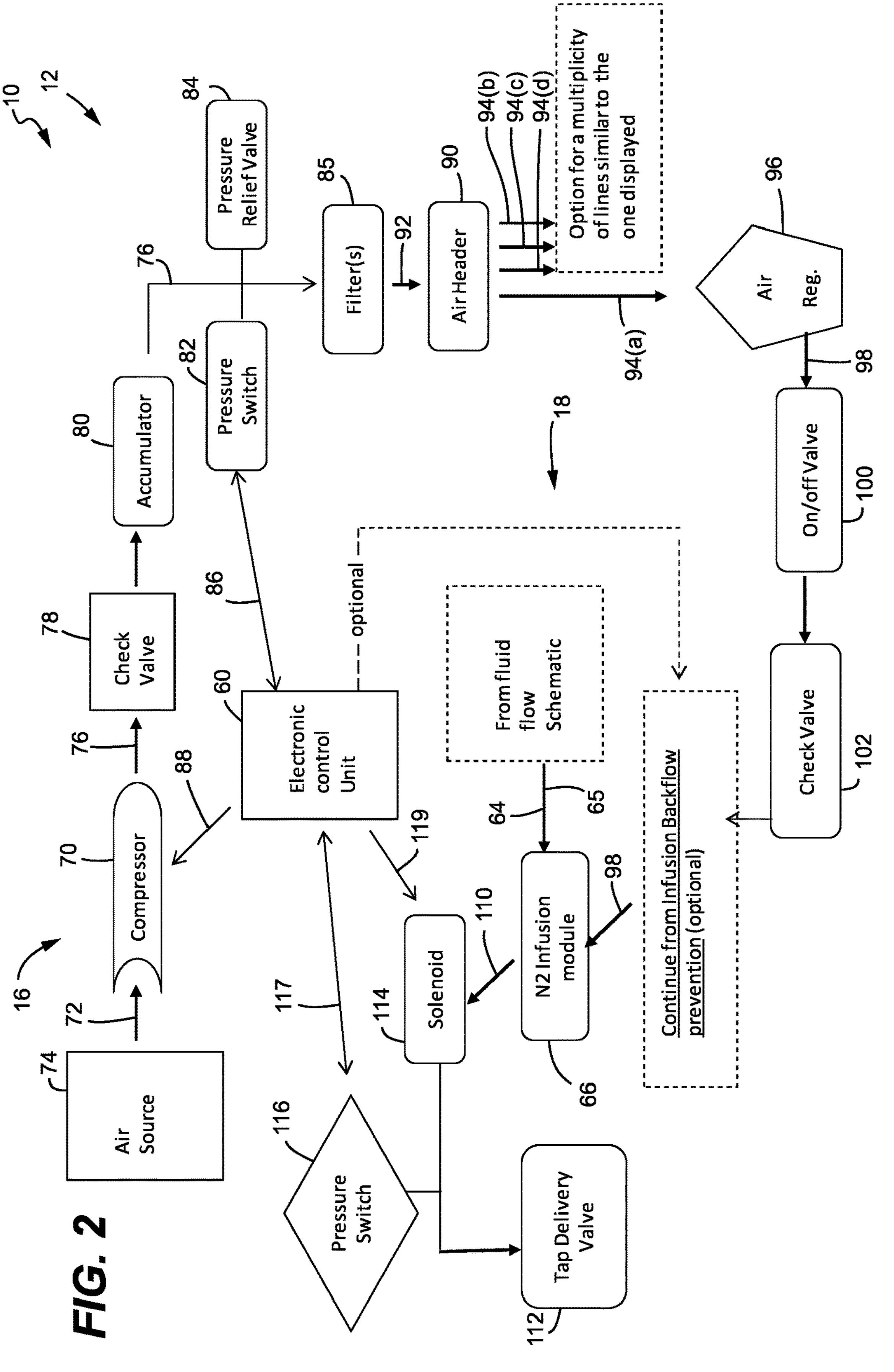
FIG. 2 is a schematic representation illustrating gas flow through the beverage infusion apparatus according to the present disclosure.

The Infusion Apparatus and Method Generally Now referring to FIGS. 1 and 2, the beverage infusion apparatus 10 and the method of infusing a gas into a beverage 12 are illustrated by the fluid flow schematic 14 and by the gas flow schematic 16. The beverage infusion apparatus 10 can be more simply referred to as the infusion apparatus or as the apparatus, and the method of infusion gas into a beverage 12 can be more simply referred to as the infusion method or as the method, as apparent from context. One skilled in the art would readily appreciate that the various devices depicted and referenced in the description and illustration of the schematics 14 and 16 and usable therein can form part of the disclosed beverage infusion apparatus 10, and that the operations formed thereby can form part of the disclosed method of infusing gas into a beverage 12. Furthermore, one skilled in the art would readily appreciate that the liquid and gas flow lines depicted in the apparatus connecting the various devices or operations can form part of the disclosed apparatus 10 and method 12. Also illustrated is an electronic monitoring and control system 18 that provides signals to various components and operations of the beverage infusion apparatus 10 and method 12 to control the dispensing of the beverage product.

FIG. 1 illustrates a fluid flow schematic 14 that begins with a water source 20 and a concentrate source 24. The water source 20 can include any source of potable or consumable water including municipal water and/or local well water. In general, potable water refers to water intended for human consumption. The potable water can be referred to herein more simply as the water 22. It is generally desirable for the water 22 to be consistent. As a result, the water 22 can be provided as filtered water and/or conditioned water. The water can be filtered by any common filtering techniques including, for example, reverse osmosis processes. In the case of various commercial locations, such as a restaurant or a convenience store, the water may be filtered before it is used in the beverage infusion apparatus 10. In any event, the apparatus 10 can include a water filtration step, if desired. It should be appreciated, however, that there is no requirement that the water is filtered. The concentrate source 24 can be any liquid that, when combined with water 22, forms the diluted concentrate diluted beverage 64 prior to gas infusion. The diluted beverage or diluted concentrate 64 refers to the concentrate that is diluted to essentially the concentration for consumption. In addition, the diluted concentrate 64 can be non-gas infused at the time it is mixed or diluted with the water 22 although alternatives are possible, and the diluted concentrate 64 can be referred to as the non-gas infused beverage 65. The concentrate source 24 can be provided as a liquid syrup 26 that flows and that will also mix with the water 22. Exemplary concentrate sources 24 include a bag in box or a keg concentrate source. It is generally expected that the concentrate source 24 will be periodically replaced once the concentrate source 24 (for example, the bag in a box) is used up or almost used up. In addition, the syrup 26 can be any type of concentrate that, when diluted with the water 22, forms the desired beverage, also referred to as the diluted beverage (or more simply as the beverage), prior to gas infusion. Exemplary syrups 26 include coffee concentrate, tea concentrate, and any other sugar or solids containing concentrate that, when diluted, provide a beverage for consumption.

It should be appreciated that the resulting gas infused beverage can be provided as a cold, room temperature, warm, or hot beverage. An exemplary type of product can be referred to as an extraction beverage. Exemplary extraction beverages include coffee and tea products such as cold brew coffee, drip coffee, espresso, turkish coffee, green tea, matcha tea, black tea, chai tea, wulong or oolong tea, white tea, puer tea, dark tea, and herbal tea. With such a product, the beverage, the concentrate and/or the water source can be refrigerated or cooled to a desired temperature, or could be at room temperature. If desired, any of the components forming the gas infused beverage can be cooled (refrigerated), allowed to be at room temperature, or heated to a desired temperature.

The load cell 27 is provided for detecting the mass of the concentrate source 24. The load cell 27 then communicates with the controller 60 via signal 29. As a result, the controller 60 is able to determine when the concentrate source 24 is low or in need of a refill or replacement. A signal can be generated, such as a light, informing the operator that the concentrate source 24 is low or is in need of refill or replacement.

The flow of water 22 from the water source 20 is controlled by the water on/off valve 28. The water on/off valve 28 can be a manual valve or an electronic valve (i.e., a solenoid valve) that allows the operator of the apparatus 10 to turn on and off the water for whatever reason. As explained below, turning off the flow of the water 22 can have the effect of shutting off the apparatus 10. That is, by turning off the water 22 via the water on/off valve 28, the water pressure switch 158 detects a low pressure that in turn informs the electronic control unit 60, and the electronic control unit 60 can then control or shut down operation of the apparatus 10.

The water 22 can pass through a cooling coil 30 that reduces the temperature of the water to a desired value. The cooling coil 30 can be provided as part of a refrigeration or cooling unit. The water 22 then passes through a pressure regulator 32 that takes the water down to a desired pressure. An exemplary desired pressure can be about 30 psi although alternative pressures may be provided. It is noted that pressure referenced herein is in gauge. Municipal or local water supplies are often provided at a pressure of about 30 to about 60 psi although the pressure can vary widely. In addition, the pressure can vary throughout the day and may vary based on the demands placed on the water system. A flow regulator 34 can be included for providing additional flow regulation. In general, the flow regulator 34 provides a finer control of the flow rate, and is a desired component although not required. An exemplary flow regulator can provide flow of the water 22 at about 1 ounce per second, although alternatives are possible.

The water 22 then flows through a water header 36. The water header 36 can be provided as a manifold that divides the water line into multiple lines. The water header 36 can also be referred to as a splitter. In the case of the water header 36, the inlet line 38 is divided into four outlet lines 40(*a*)-(*d*) although alternatives are possible. Additional or fewer outlet lines can be provided, if desired. The flow downstream of outlet lines 40(*b*)-40(*d*) can be similar to the flow downstream of the outlet line 40(*a*) which is exemplified in more detail. The beverage infusion apparatus 10 is available to provide multiple infused beverage products, and the user has the ability to select the desired product. At the water header 36, the water 22 is divided into multiple streams to provide multiple infused beverage products. As described, the apparatus 10 can provide, in a preferred embodiment, flow to one of the outlet lines 40(*a*)-(*d*) at a time although alternatives are possible.

Downstream of the water header 36 is a check valve 42 that prevents backflow into the water header 36. A concern is the possible effect of backflow of the concentrate (either the concentrate or the diluted concentrate) or backflow of the cleaning liquid as described below in the context of cleaning the system. The water 22 then flows into a blender 44 where it is combined with the syrup 26. The blender 44 can be provided as a static blender although alternatives are possible.

The syrup 26 flows through a pump 50 that provides for volumetric flow control to the blender 44. The syrup 26 can flow from the concentrate source 24 to the pump 50 through a stop valve 54 and/or a connector 56. The stop valve 54 can provide automatic closure of the line to the pump 50 once the concentrate source 24 is disconnected from the beverage infusion apparatus 10. This is advantageous to prevent the syrup 26 from leaking out of the tubing connecting to the pump 50 during replacement of the concentrate source 24. In addition, the connector 56 can be provided with a built-in auto disconnect valve that disconnects the concentrate source 24 from the beverage infusion apparatus 10 once the valve is turned off. It should be appreciated that various connection and flow control systems are available for attaching the concentrate source to the beverage infusion apparatus 10. As the beverage is dispensed from the beverage infusion apparatus 10, the syrup 26 is eventually used up, and the concentrate source 24 requires replacement. Also, the cleaning solution is connected via the pump 50 to provide desired dosing of the cleaning solution through the apparatus, as described in more detail below. There are systems known for attaching a concentrate source to an inlet line of a beverage dispenser, and any of those known systems can be used.

The pump 50 is provided for delivering a consistent volume of syrup (or cleaning solution). Various pumps can be utilized. In the preferred embodiment disclosed, the pump 50 is a peristaltic pump 52 that provides for a consistent volumetric flow of the syrup 26. The peristaltic pump 52 can squeeze a tube containing the syrup 26 using rollers to provide pulses of the syrup 26 at a constant rate. Alternative pumps can be used. The pump 50 can be controlled by a controller 60 that provides a signal to the pump 50 thereby controlling the volumetric amount or flow rate of the syrup 26 to the blender 44. The controller 60 provides an electronic signal 62 to the pump 50 instructing the pump 50 to dispense or to not dispense the syrup 26 to the blender 44. A check valve 58 can be provided between the pump 50 and the blender 44 to prevent reverse flow.

The pump 50 can provide or dispense a particular volumetric amount of the syrup 26. Knowing the volumetric amount of the syrup 26 that the pump 50 dispenses, and also knowing the concentration of the syrup 26, and the pressure and/or flow rate of the water 22, the controller 60 can send a signal 62 to pump 50 for dispensing a desired amount of the syrup 26 to form the final beverage product. It should be appreciated that the ratio of the syrup 26 to the water 22 depends on the concentration of the syrup and the flow rates of the syrup 26 and the water 22, and the desired final product concentration. One skilled in the art would appreciate that these factors will influence the selection of the ratio of the syrup 26 and the water 22. By way of example, a ratio can be selected that provides a consistent dilution for the dispensed beverage product. An exemplary volumetric ratio of the syrup 26 to the water 22 can be about 1:1 to about 1:30. Alternatives include about 1:2 to about 1:20, about 1:3 to about 1:15, about 1:4 to about 1:12.

The blender 44 can be provided as a static blender for diluting the syrup 26 with the water 22 although alternatives are possible. A static blender 44 is desirable because of the lack of moving parts. The resulting diluted concentrate or beverage 64, which can also be referred to as a non-gas infused beverage 65, can be conveyed to an infusion module 66 to provide for infusion of gas into the diluted beverage 64 or non-gas infused beverage 65. Downstream processing of the diluted beverage 64 or non-gas infused beverage 65 in the gas infusion module 66 is illustrated in FIG. 2.

Now referring to FIG. 2, the gas flow schematic 16 is illustrated showing how the beverage infusion apparatus 10 operates to provide gas infusion of the diluted beverage 64 or non-gas infused beverage 65 in the infusion module 66.

A compressor 70 draws infusion gas 72 from a source of infusion gas which may be atmospheric air 74. It is well known that air generally contains about 78% nitrogen. In general, air typically contains 78% nitrogen, 20.9% oxygen, 0.9% argon, and other components. The air can be characterized as containing at least 10% oxygen as a way to distinguish from purified nitrogen found, for example, in pressure canisters. In addition, the atmospheric air can also be characterized as comprising at least 78% nitrogen and at least 20% oxygen which is generally intended to refer to the chemical content of atmospheric air. This definition of the atmospheric air can be applied to the air used in the various embodiments described herein. Accordingly, in order to obtain a nitrogen infused beverage, it is possible to compress atmospheric air to provide the desired infusion gas containing nitrogen. It is noted that many nitrogen infusion apparatuses rely upon purified nitrogen because it is desired to remove oxygen from the gas. The reason for this is that oxygen has a tendency to oxidize a beverage over time. Oxidation, however, is not a concern for the beverage infusion apparatus 10 because the beverage is intended to be consumed within a fairly short period of time after it is infused with the infusion gas 72, and oxidation is not a concern in view of this short time window. Accordingly, the presently described infusion apparatus and method is desirable because it provides for nitrogen infusion without the need for obtaining purified nitrogen. Instead, regular air is suitable for use in forming the compressed nitrogen source.

The compressor 70 conveys compressed infusion gas 76 through a check valve 78 and into an accumulator 80 where it is stored. The accumulator 80 is in fluid communication with a pressure switch 82 and a pressure relief valve 84. In FIG. 2, the pressure switch 82 and the pressure relief valve 84 are shown downstream of the accumulator 80, but they can actually be provided as part of the accumulator 80. Furthermore, the pressure switch 82 informs the controller 60 of the pressure within the accumulator 80 via the electronic signal 86. If the pressure within the accumulator 80 is below a preset low-value, the controller 60 informs the compressor 70 via the electronic signal 88 to begin compressing the infusion gas 72. If the pressure within the accumulator 80 is at or above a preset high-value, the controller 67 informs the compressor 70 via the electronic signal 88 to stop compressing the infusion gas 72. The pressure relief valve 84 is available to release the pressure in the accumulator 80 if the pressure exceeds a safety threshold.

The compressed infusion gas 76 is filtered via the air filter 85, and introduced into the air header 90. The air header 90 is a manifold, similar to the water header 36, and can be referred to as a splitter. The air header 90 splits the incoming gas stream 92 into a plurality of outlet gas streams 94(*a*), 94(*b*), 94(*c*), and 94(*d*). The number of outlet gas streams can be provided to correspond to the number of infused beverage products available by the apparatus 10. The outlet gas streams 94(*b*), 94(*c*), and 94(*d*) can be processed similarly to outlet gas stream 94(*a*), but provide for the multiple infused beverage products. As illustrated, the incoming gas stream 92 is split into four outlet gas streams, but this number can be two outlet gas streams, three outlet gas streams, or four or more outlet gas streams. The processing of the outlet gas stream 94(*a*) is illustrated in FIG. 2, and the remaining outlet gas streams can be processed similarly.

The outlet gas stream 94(*a*) is pressure regulated by a regulator 96 that adjusts or reduces the pressure to a level above the liquid line pressure. The pressure of the outlet gas stream 94(*a*) is selected depending on the amount of gas desired to be incorporated into the diluted beverage 64. In general, providing the gas above the liquid pressure means that the gas will tend to go into the liquid. Preferably, the regulator 96 controls the gas pressure to within about 10 psi above the diluted beverage 64. The gas pressure can be provided from about 3 psi to about 8 psi above the diluted beverage 64. If the pressure of the infusion gas is too high, the resulting beverage may become too foamy when released from the apparatus. Of course, this depends on a number of factors including the beverage properties and how much gas is to be included in the dispensed product, and one skilled in the art can certainly select the pressure to obtain the desired final product. By maintaining the infusion gas pressure above the liquid pressure, it is possible to maintain flow of the infusion gas toward the infusion module 66 and into the diluted beverage 64. For example, if the pressure in the accumulator is about 50 to about 60 psi, and the liquid line pressure is about 22 psi, then it may be desirable to select the regulator 96 to provided control of the gas pressure of the infusion gas to about 27 psi. This permits the flow of infusion gas 98 from the regulator 96 into the infusion module 66 while providing a desired amount of gas to infuse into the diluted beverage 64.

The flow of the infusion gas 98 can be turned on or off by the on/off valve 100. It may be important to turn off the flow of the infusion gas during cleaning of the infusion module. The check valve 102 is provided to prevent backflow. Preventing backflow is important, for example, when cleaning so that cleaning fluid or diluted concentrate is prevented from flowing upstream.

In the infusion module 66, the diluted beverage or non-gas infused beverage 64 is combined with the infusion gas 98 to produce a gas infused beverage 110. The gas infused beverage 110 is then dispensed through the tap delivery valve 112. A solenoid valve 114 is provided for turning on or off flow of the gas infused beverage 110 to the tap delivery valve 112. This may be important, for example, when cleaning the infusion module 66. The pressure switch 116 senses when the tap delivery valve 112 is open, and sends an electronic signal 117 to the controller 60. As a result, the controller 60 receives an input that the gas infused beverage 110 is being dispensed, or alternatively when the user has depressed the tap delivery valve 112 to create flow of the gas infused beverage 110. Alternatively, opening the tap delivery valve 112 creates a low pressure situation that is registered by the pressure switch 116 which sends a signal 117 to the controller 60 that, in turn, causes the solenoid 114 to open and the pump 50 to pump the syrup 26. When the tap delivery valve 112 is open, the diluted beverage 64 and the infusion gas 98 both flow into the infusion module 66. The controller 60 informs the pump 50, via signal 62, to dispense syrup 26 to the blender 44 where it is mixed with the water 22 to form the diluted beverage 64. When the tap delivery valve 112 is closed, the pressure switch 116 is triggered and a signal 117 is sent to the controller 60, and the controller instructs the solenoid 114 via signal 119 to close, and the pump 50 via signal 62 to stop.

The Infusion Gas Module

Figure 3A:
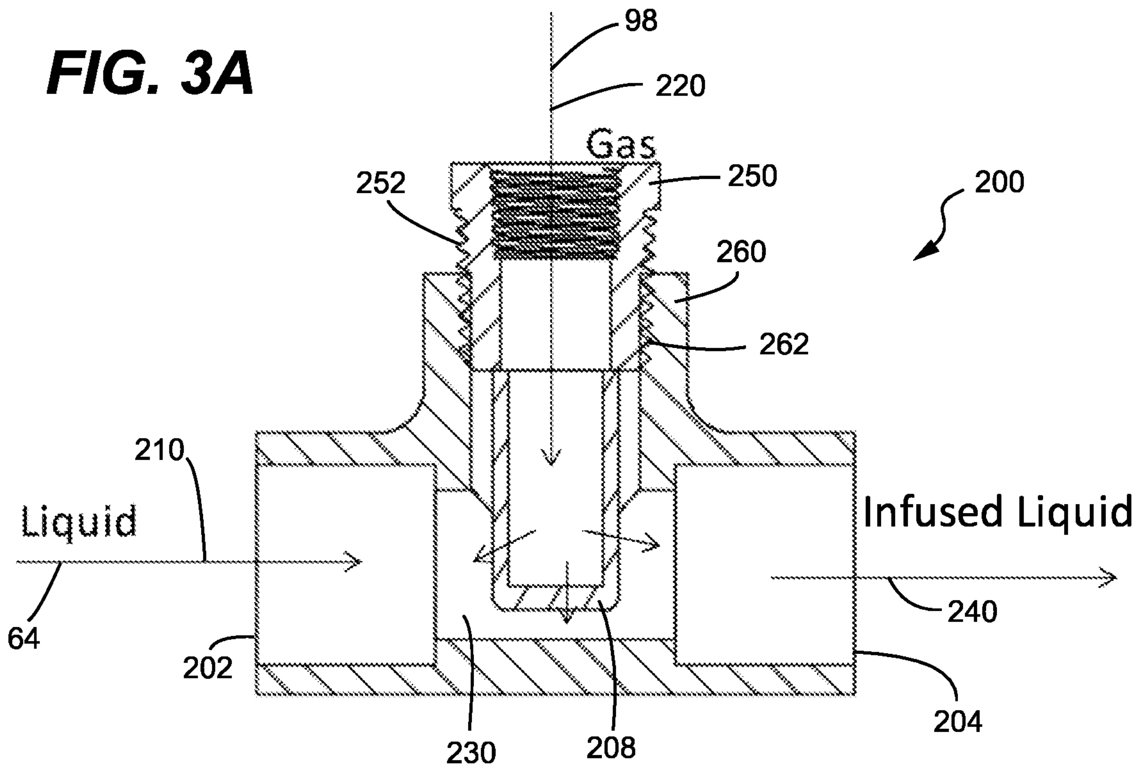
FIGS. 3A and 3B are sectional views showing an infusion module that can be used in the beverage infusion apparatus according to the present disclosure.
Figure 3B:
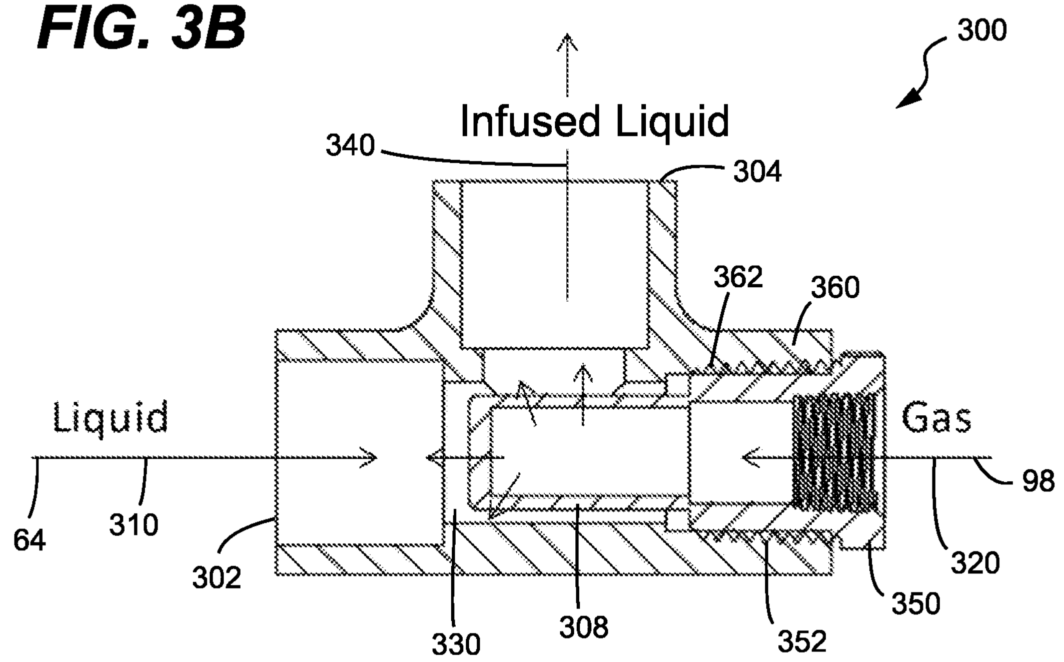

Now referring to FIGS. 3A and 3B, alternative gas infusion modules 200 and 300 are illustrated. Both gas infusion modules 200 and 300 can be used as the gas infusion module 66 in FIGS. 1 and 2. The gas infusion modules 200 and 300 show the interaction between the diluted beverage 64 which can be referred to as the liquid 210 or liquid 310 and the infusion gas 98 which can be referred to as the gas 220 or gas 320.

In the case of the gas infusion module 200 depicted in FIG. 3A, the liquid 210 flows straight through from an inlet 202 to an opposite outlet 204, and is interrupted by a porous gas infusion stone 208. The gas 220 flows into an interior of the porous gas infusion stone 208, and flows out of the porous gas infusion stone 208 via small pores thereby forming small cells of the gas in the liquid 230. The small cells of infusion gas form in the liquid 230 surrounding the exterior of the porous gas infusion stone 208. By causing the gas 220 to pass through the porous infusion stone and form small cells, the gas is better able to become absorbed into the liquid 230, and the resulting gas infused liquid 240 flows out of the gas infusion module via the outlet 204. As illustrated, the infusion stone 208 is located or placed in a straight through flow arrangement for the liquid flowing from the inlet 202 to the outlet 204.

The gas 220 is conveyed to the gas infusion module 200 by a line that includes a threaded cap 250. The threaded cap or fitting 250 is adapted to fit the threaded gas inlet port 260 via mating threads 252 on the threaded cap 250 and mating threads 262 on the threaded gas inlet port 262.

Now referring to FIG. 3B, an alternative gas infusion module 300 is illustrated. The gas infusion module 300 is similar to the gas infusion module 200 except that the liquid 310 turns from the inlet 302 to the outlet 304. In the embodiment shown, the turn is a 90° turn although alternatives are possible. It should be appreciated that the turn can be provided at any angle from above 0 degrees (which corresponds to straight through flow). An advantage of causing the liquid 310 to turn is greater residence time for the liquid 330 in contact with the porous gas infusion stone 308 resulting in potentially better infusion of the gas into the liquid to form the gas infused liquid 340. Similarly, the gas 320 is conveyed to the gas infusion module 300 by a line that includes a threaded cap 350. The threaded cap or fitting 350 is adapted to fit the threaded gas inlet port 360 via mating threads 352 on the threaded cap 350 and mating threads 362 on the threaded gas inlet port 362.

In general, the porous gas infusion stone useful in the disclosure can be provided as a commercially available product and are generally well known and can be referred to as diffusion stones or sparging stones and are commonly used in fish tanks to aerate the water. In general, the diffusion stones or sparging stones useful in the present apparatus have a pore size selected to provide a desired level of gas infusion into the liquid. If the pores are too large, the gas does not infuse as well. If the pores are too small, the pressure drop may be too great and the pores may become more readily occluded. A preferred range of pore size is about 0.2 um to about 2 um, and more preferably about 0.5 um to about 2 um. The diffusion stone or sparging stones may be made of porous metal (such as stainless steel) and can be formed as a cup attached to the fitting 250 or 350.

When liquid is not flowing through the gas infusion module, and as a result gas is also not flowing through the porous gas infusion stone, there is a tendency for the liquid to flow into the porous gas infusion stone. Because the liquid contains solids, there is a possibility that the solids may occlude the pores of the porous gas infusion stone. To address this, the apparatus 10 provides for back flushing the gas infusion module. Now referring to FIG. 1, the back flushing system is depicted at reference number 150. In general, the water 22 flows via the back flushing line 152 when the solenoid 154 is opened. The solenoid 154 is opened via a signal 156 from the controller 60. The water 22 then flows into the back flushing water header 158 that splits the water 22 into several lines corresponding to the number of gas infusion modules in need of back flushing. As discussed previously, the water header 36 and the air header 90 split the water 22 and the compressed gas 92 into separate streams to provide for multiple lines for dispensing various gas infused beverages. The back flushing water header 158 is similar and provides lines 160(*a*)-(*d*), or as many lines as needed, to provide for cleaning of the various gas infusion modules in the various lines for providing the various gas infused beverages. The water 22 then flows through the check valve 162 and then into the infusion module 66. The water 22, during back flushing, can enter the infusion module 66 via the infusion gas line 98 to flush out the liquid that may have entered through the pores of the diffusion stone or sparging stone. This is depicted in, for example, FIG. 2. In addition, it should be understood that the back flushing is optional and can be advantageously performed between cleanings with cleaning solution and can help provide removal of cleaning solution that might remain in the diffusion module 66, and helps provide flushing therefrom.

The Dispensing Nozzle

Now referring to FIGS. 4A-4D, an exemplary dispensing nozzle that can be used in the tap delivery valve 112, for example, is depicted at reference number 400. In general, the dispensing nozzle 400 includes an outlet end 402, an inlet end 404, a flow director 406, and an orifice plate 408. The dispensing nozzle 400 includes a housing body 410 and an interior conduit or lumen or bore 412. The orifice plate 408 is located within the conduit 412 near the inlet end 404, and the flow director 406 is located within the conduit 412 and downstream of the orifice plate 408. The flow director 406 acts as a guide for flow of the gas infused beverage when the tap delivery valve 112 is open. When the tap delivery valve 112 is open, the gas infused beverage is able to flow through the orifice plate 408 and around the flow director 406, and out the outlet end 402.

The dispensing nozzle 400 includes a flange 420 at the inlet end, and the flange 420 includes an interior threaded surface 422. In view of the threaded surface 422, the dispensing nozzle 400 threads onto an outer periphery of a tap delivery valve. In addition, the orifice plate 408 is shown resting on a shelf 424.

The orifice plate 408 can be referred to as a restrictor plate and is provided to create a region of back pressure on the upstream side of the restrictor plate. In general, the higher the gas infused beverage pressure, the greater the amount of nitrogen containing gas that can be infused into the liquid. Furthermore, a large pressure drop across the restrictor plate has a tendency to cause a lot of gas (for example, nitrogen) to come out of solution and help create a cascade of gas (for example, nitrogen) bubble. Such a cascade of nitrogen bubbles is perceived as a desired result because of taste, texture, flavor, and appearance. During dispensing, tiny bubbles begin to form in the gas infused beverage once the gas infused beverage passes through the restrictor plate as a result of the pressure drop, then the gas infused beverage passes through the small circumferential gap between the conduit 412 and the flow director 406, and then out of the nozzle at outlet end 402 and into, for example, a glass or other container for consumption. In the restrictor plate 406 shown in FIG. 4C, the restrictor plate 406 includes orifices 414 that can be about 0.65 mm in diameter, the thickness of the restrictor plate 406 can be about 0.7 mm, and the length of the restrictor plate can be about 58 mm, although alternatives are possible.

Alternative Flow Restriction Device or Back Pressure Device Downstream of the Infusion Module and Upstream of the Dispensing Nozzle The back pressure can advantageously be provided upstream of the dispensing nozzle 400 at a location between the dispensing nozzle 400 or tap delivery valve 112 and the infusion module 66.

The solubility of gas in a liquid is proportional to pressure according to Henry's law. As the pressure of a liquid solution drops, gas solubility drops and vice versa. In the case of a gas-infused beverage, the infused gas will come out of solution as the pressure drops. When dispensing a gas-infused beverage, there is a pressure drop associated with the opening of the dispensing faucet or valve.

One benefit of dispensing a gas-infused beverage is the formation of foam or bubbles as gas comes out of solution due to the pressure drop. This is very aesthetically pleasing to see and even hear. Another benefit of dispensing a gas-infused beverage is the change in taste, usually an improvement, from its equivalent uninfused state. For gases that have a relatively low solubility, such as oxygen and nitrogen, maintaining a high pressure throughout the dispensing system prior to leaving the dispensing tap or nozzle is helpful in keeping the gas in solution and giving the consumer a good sensory experience.

Figure 4A:
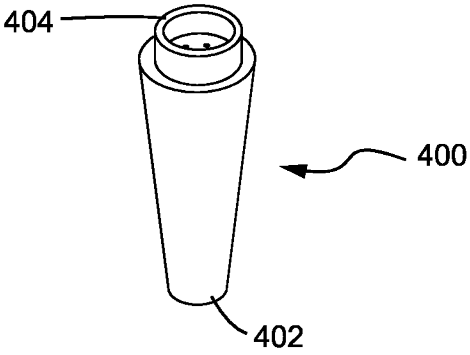
FIGS. 4A-4D illustrate a nozzle that can be used for dispensing the gas infused beverage according to the present disclosure.
Figure 4B:
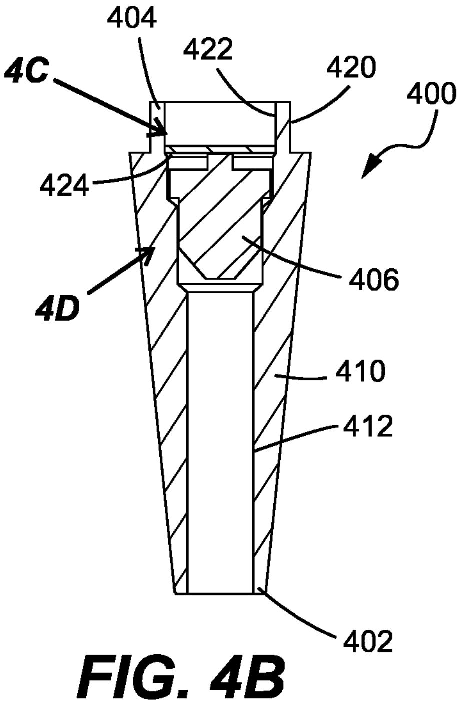
Figure 4C:
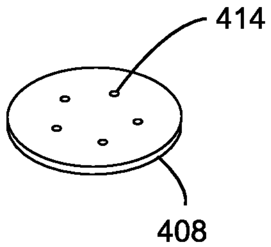
Figure 4D:
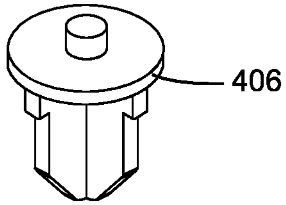

To maintain sufficient liquid pressure prior to dispensing, a flow restriction device can be used to advantage. In infused beverages, such as beer or coffee, this can be accomplished by adding a downstream tap/faucet restriction, usually a multi-holed plate between the faucet and dispense nozzle. Such a plate is illustrated in FIG. 4C at reference number 408. This arrangement has advantages, such as added system flexibility to dispense any type of fluid by swapping out the faucet or removing the plate restriction. There are some disadvantages though. For example, the diameter of the holes used to provide the required restriction may be small, for example, about 0.7 mm. Such small holes may be susceptible to occlusion. This adds another maintenance step because the plate needs to be removed and periodically. This maintenance adds cost. Furthermore, the restriction plate 408 is likely in contact with the atmosphere since the beverage will likely drain from the lumen 412. This contact with the atmosphere may result in bacterial growth on the plate 408.

By placing a restriction upstream of the dispensing nozzle 400 or the tap delivery valve 112, several advantages can be provided. Standard and more cost-effective dispensing faucets or valves can be utilized, the proclivity for a health hazard due to bacterial growth on the restriction device can be diminished by isolating the restriction device from the atmosphere, and larger hole or holes for providing back-pressure (rather than multiple smaller holes) can be used to lower the risk of occlusion and provide for less frequent maintenance.

Because gas will begin to come out of solution prior to leaving the dispensing faucet, there is a limit to how far upstream the restriction can be placed without affecting consumer experience. This limit is dependent on the liquid flow rate, $\dot{V}$, and the volume of liquid between the restriction and the dispensing faucet, V. The time, $t_r$, the liquid resides in the flow path prior to dispensing is then $t_r=V/\dot{V}$. In the case of a gas infused beer or coffee, there is a time, called the cascade time, $t_c$, that represents the amount of time for the gas to dissolute and generally reside on the surface of the liquid in the form of foam. If $t_r \ll t_c$, then no or negligible effect will be observed by a consumer.

Figure 5A:
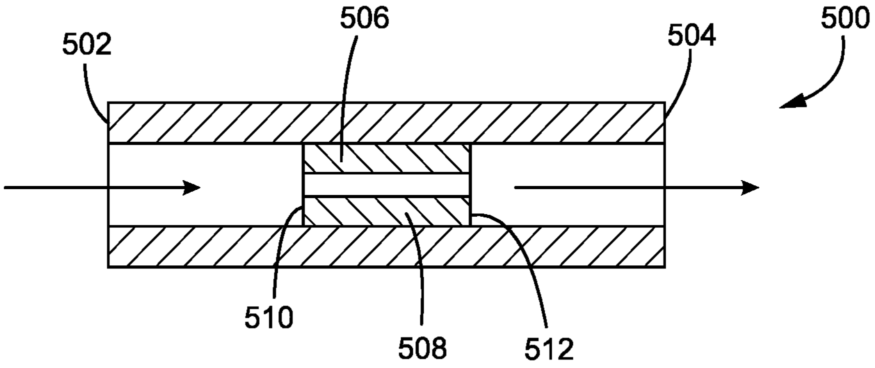
FIGS. 5A-5C illustrate alternative flow path configurations for providing a restriction that can be arranged upstream of a dispensing tap provided in the beverage infusion apparatus according to the present disclosure.
Figure 5B:
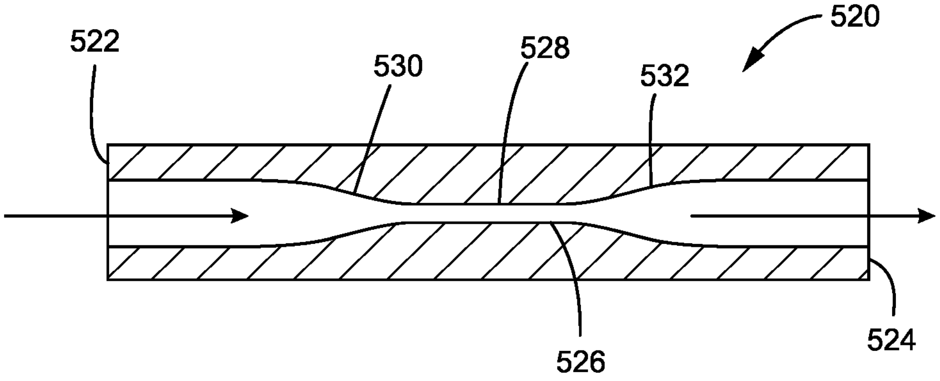
Figure 5C:
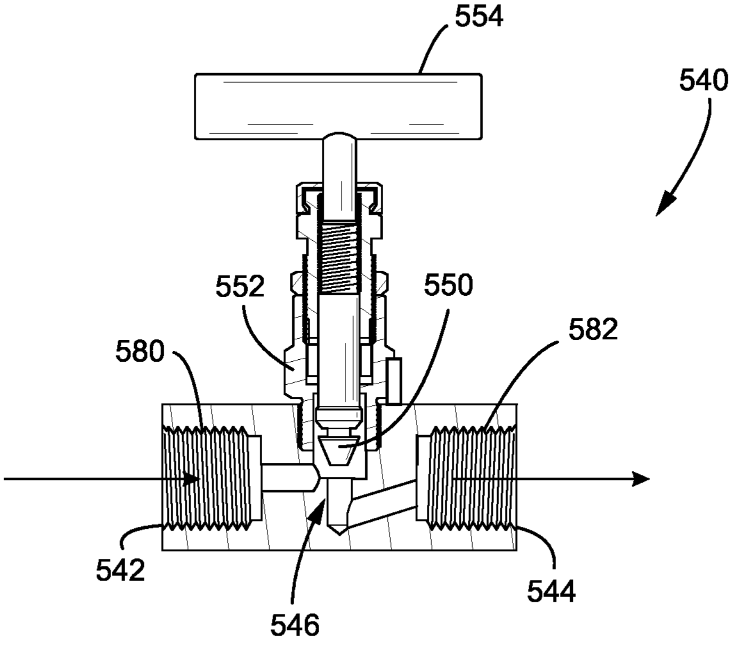

Now referring to FIGS. 5A-C, alternative restrictions can be provided in the beverage infusion apparatus upstream of the dispensing nozzle 400 or the tap delivery valve 112 and downstream of the infusion module 66. FIG. 5A illustrates a flow restriction device 500 located between the infusion module 66 and the dispensing nozzle 400. The flow restriction device 500 includes an inlet 502, an outlet 504, and a restriction 506. In this case, the restriction 506 can be provided as a narrowing 508 having a smaller bore diameter, and either side of the narrowing can be provided as an abrupt change 510 and 512. FIG. 5B illustrates a flow restriction device 520 that is also located between the infusion module 66 and the dispensing nozzle 400, and includes an inlet 522, an outlet 524, and a restriction 526 having a reduced bore 528. The restriction can be more gradual at one or both sides of the restriction 530 and 532. FIG. 5C illustrates an alternative restriction 540 that can provide for adjustable back pressure restriction. The restriction 540 is also located between the dispensing nozzle 400 and the infusion module 66. The restriction 540 is illustrated as removable from a fluid line in view of the threaded connections 580 and 582 although alternative connection means can be provided. It is pointed out that the exemplary restriction devices 500 and 520 can similarly be provided as removable from a fluid line. The flow restriction device 540 includes an inlet 542, an outlet 544, and an adjustable restriction 546. The adjustable restriction 546 can be provided by a plunger 550 that can rotate within a plunger housing 552 via handle 554 and either increase or decrease the flow through the adjustable restriction 546. The plunger can depress tubing that contains the liquid, or it can obstruct the flow directly. An advantage of the restriction device 540 is the ability to adjust the amount of restriction provided.

Although exemplary flow restriction devices are depicted in FIGS. 5A-5C, alternatives can be utilized that provide the same inherent function. The size of the restriction is based on the desired flow rate and back pressure. FIG. 5A illustrates a simple cartridge-style restriction insert into an existing beverage flow path. The insert has a single hole sized to provide the adequate amount of backpressure. The diameter of the cartridge restriction is the same or slightly larger (in the case of pliable tubes) than the inner diameter of the beverage flow path. The friction between the cartridge and the beverage flow path is sufficient to maintain its position. FIG. 5B is another example of a restriction achieved by a narrowing of the flow path. FIG. 5C illustrates another embodiment of a restriction that is adjustable. Essentially, any device that will restrict the flow in such a way to maintain enough backpressure of the fluid upstream of the nozzle 400 can be provided.

Electronic Control Logic

Figure 6:
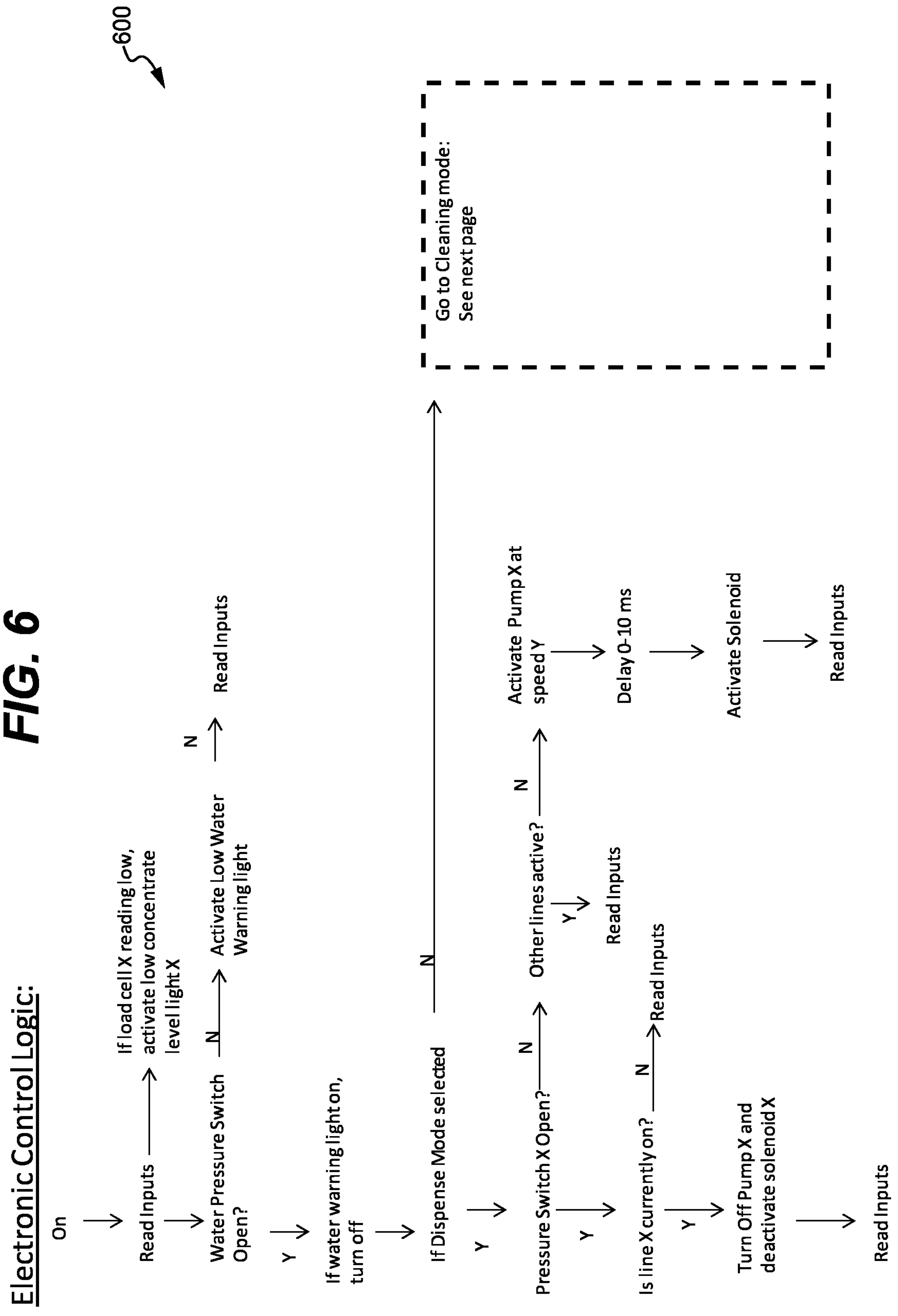
FIG. 6 is a schematic representation of the electronic control logic for the beverage infusion apparatus according to the present disclosure.
Figure 7:
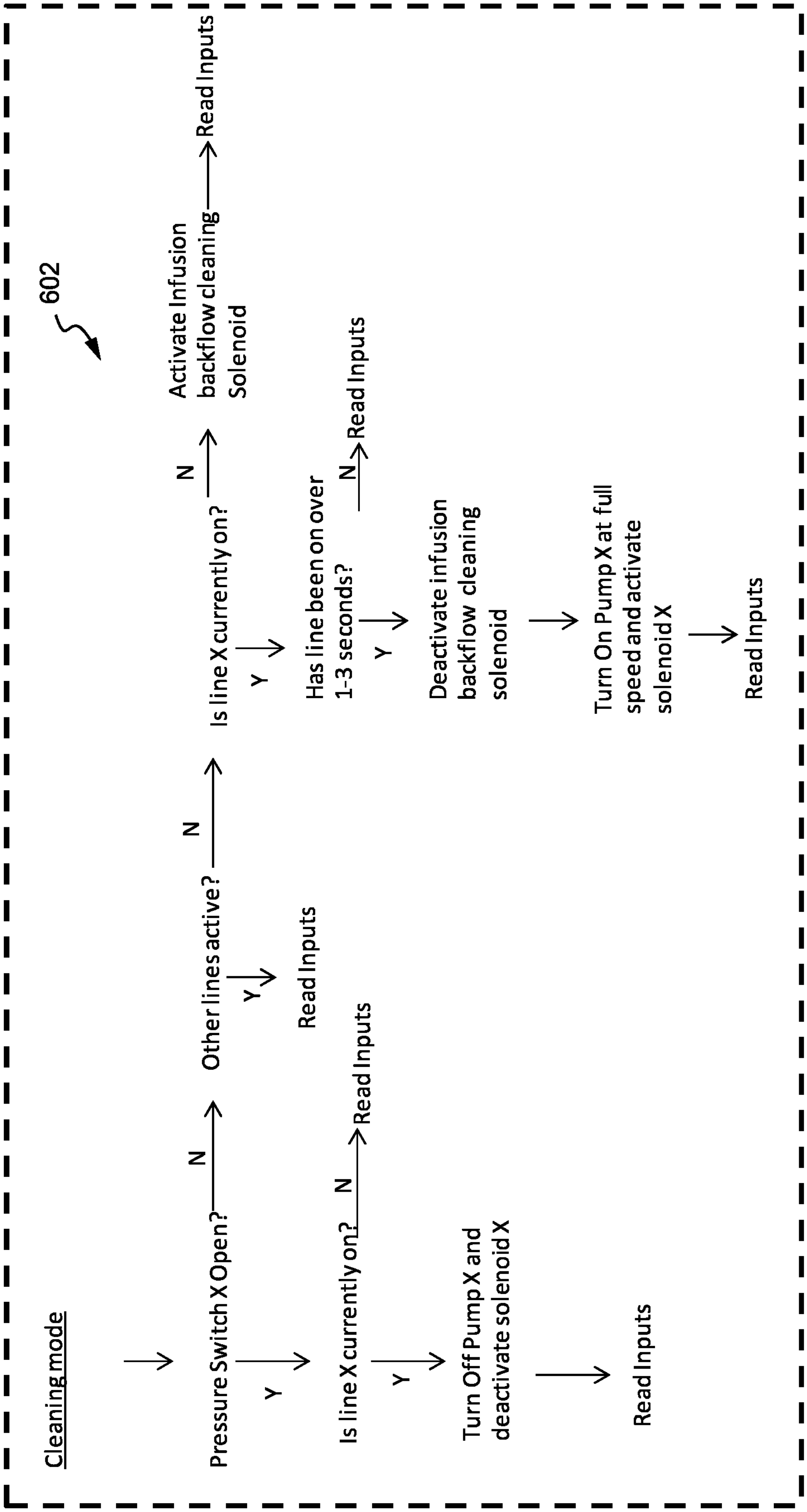
FIG. 7 is a schematic representation of an exemplary cleaning mode for the beverage infusion apparatus according to the present disclosure.

Now referring to FIGS. 6 and 7, the electronic control logic for operating the beverage infusion apparatus 10 is illustrated at reference number 600 and the electronic control logic for cleaning the beverage infusion apparatus 10 is illustrated at reference number 602. It should be appreciated that these are preferred control logic arrangements, and alternatives can be provided.

Alternative Beverage Infusion Apparatus

Figure 8:
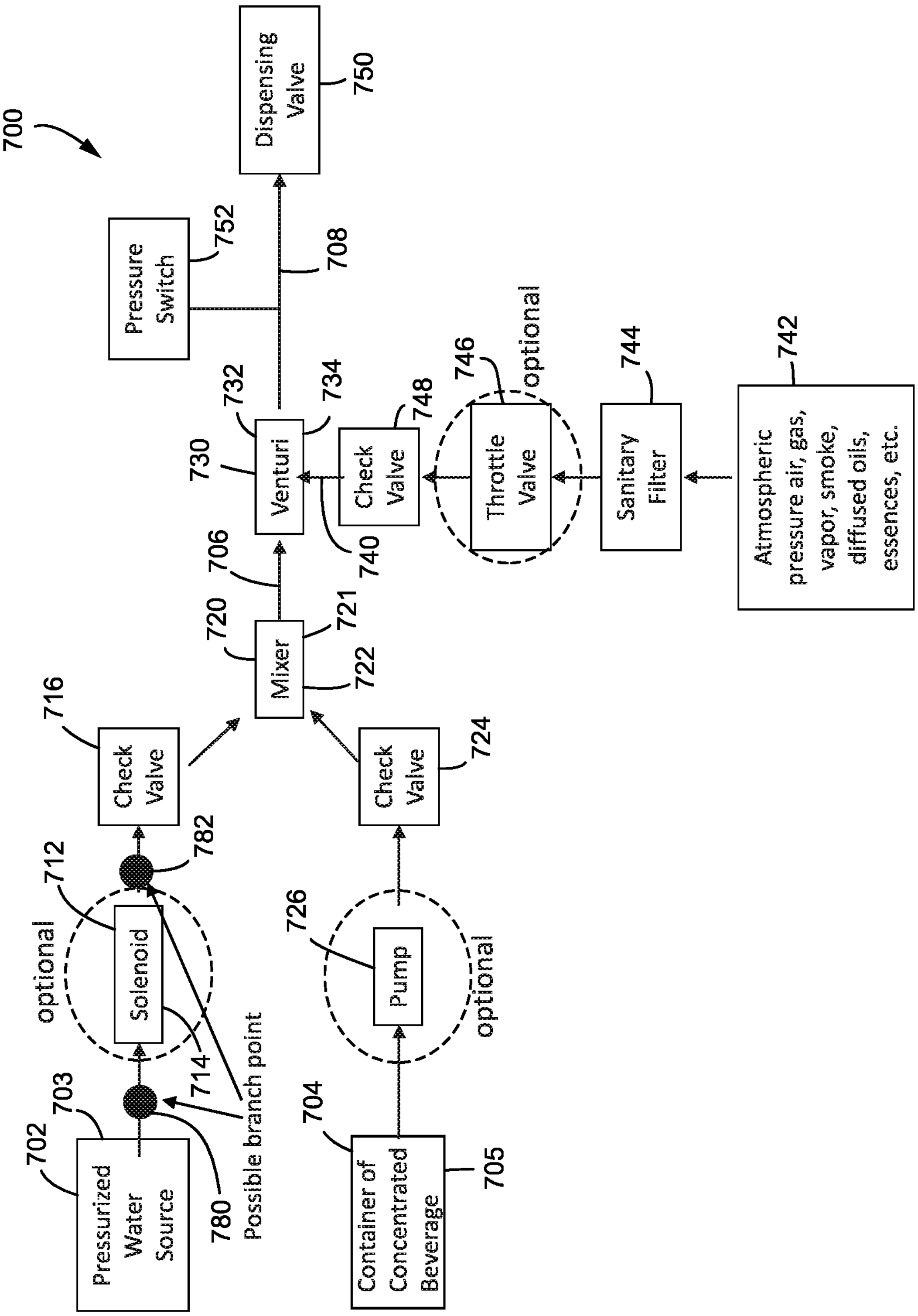
FIG. 8 is a schematic representation illustrating a beverage infusion apparatus and flow through the beverage infusion apparatus according to the present disclosure.

Now referring to FIG. 8, an alternative beverage infusion apparatus according to the present disclosure is illustrated at reference number 700. The beverage infusion apparatus 700 is advantageous relative to the prior described beverage infusion apparatus because it is simpler in construction and operation. As illustrated, the beverage infusion apparatus 700 can provide a gas-infused beverage 708 without many of the components of the previously described beverage infusion apparatus including the concentrate pump, the compressor, the porous gas infusion stone, and the controls system.

The beverage infusion apparatus 700 includes a water source 702 and concentrate source 704. The water source 702 and the concentrate source 704 can be combined to form the diluted concentrate or pre-infused beverage 706 the diluted concentrate or pre-infused beverage 706 can then be infused with nitrogen containing gas to form the gas-infused beverage 708 which is dispensed from the beverage infusion apparatus 700 via the dispensing valve or tap 710. The water source 702 and the concentrate source 704 can be the same as or similar to the previously described water source 20 and the previously described concentrate source 24. The water source can be referred to as the water stream 703 or as the water 703 for convenience, and the concentrate source 704 can be referred to as the concentrate stream 705 or as the concentrate 705 for convenience.

As discussed previously, the water source can be any source of potable water or liquid containing water that is suitable for human consumption. The water source need not be purified water, and can include other components such as foods, minerals, vitamins, flavorants, and other additives or components found in liquid products for human consumption. By way of example, the water source can be water purified by filtering filtered to remove contaminants. It should also be noted that the water source can be a municipal or well water source, and it can also be a manufactured product that includes a water containing liquid. Exemplary manufactured products that can be considered a type of water source include those products that contain water in combination with something else for consumption. Examples include dairy milk, including skim milk, reduced fat milk, whole milk, and high fat milk, non-dairy milk, including almond milk, oat milk, soy milk, coconut milk, rice milk, cashew milk, macadamia milk, hemp milk, etc., or a slurry or liquid that contains water and is suitable for consumption. Exemplary nondairy products can be referred to as nut milks, grain milks, etc. Other non-dairy products include those products manufactured using oils and/or flavorants to form a creamer like product. The water source can include a sweetener, such as, sugar, artificial sweetener, non-sugar natural sweetener, etc. In general, such manufactured products can be available in a container such as a bag or container (plastic, metal, or other material to prevent leakage), and the product contained therein can be pumped into the beverage infusion apparatus 700 via the water source 702. The pump for pumping the manufactured product can be provided as a booster pump. Furthermore, the water source can be provided at the desired pressure by use of a booster pump. The concentrate 705 can be the concentrated coffee, tea, or other concentrated beverage.

The water 703 flows through a valve 712 that may be a solenoid valve 714 for controlling flow of the water 703. It should be appreciated that the reference to water includes water and other components as discussed above. That is, the water can be provided as purified water, municipal water, well water, filtered water, and the water can contain other components therein so that it can be considered, for example, a manufactured product, such as dairy milk, non-dairy milk, or other water containing liquid. A check valve 716 can be provided to ensure backflow prevention. The water 703 then flows into the mixer 720. The concentrate 705 flows through a check valve 724 to prevent backflow and into the mixer 720. A pump 726 can be provided for assisting the flow of the concentrate 705. The pump 726 is optional, but can be advantageous to help control the correct flow of the concentrate 705 into the water 703. As discussed below, the pump 726 can be controlled by a controller that controls the speed of the pump, the volume dispensed over time, and its on and off condition. Depending on the concentration of the concentrate 705, the ratio of the water 703 to the concentrate 705 can be controlled to provide a desired diluted concentrate or pre-infused beverage 706 concentration. Exemplary ratios of concentrate 705 to water 703 can be about 1:1 to about 1:30. Alternative ratios of concentrate 705 to water 703 include about 1:2 to about 1:20, about 1:3 to about 1:15, and about 1:4 to about 1:12. It should be appreciated that these ratios can be provided as volume ratios or as weight ratios (preferably volume ratios).

The pump 726 is optional, and can be used to advantage to help ensure the desired ratio of concentrate 705 to water 703. The pump 726 can be a pump that provides for volumetric flow, and an example is a peristaltic pump. As described previously, the water 703 can flow through a cooling coil that reduces the temperature of the water, and can be provided with a pressure regulator to control the desired pressure of the water.

The mixer 720 can be provided as a static mixer 721. Various static mixers are known that can be used to mix the water 703 and the concentrate 705. A preferred static mixer 721 that can be used to mix the water 703 and the concentrate 705 includes a liquid draw venturi device 722. In general, a venturi is a tube through which a first liquid passes and where there is a restriction causing a decrease in static pressure at the location of the restriction. In view of the decrease in static pressure, a second liquid inlet can be provided at or near that restriction that draws a second liquid into the first liquid. This type of arrangement can be referred to as a liquid draw venturi device. The liquid draw venturi device 722 can be used to control the ratio of the concentrate 705 introduced into the water 703 flowing through the liquid draw venturi device 722. The pump 726 can be provided to assist with the volumetric flow of the concentrate 705 into the water 703 flowing through the liquid draw venturi device 722 to more accurately control the ratio of the concentrate 705 to the water 703 to desired levels. The combination of the pump 726 and the liquid draw venturi can be advantageous because the power needed to operate the pump 726 can be reduced as a result the liquid draw venturi device 722. In addition, the pump 726 can be used to pump the concentrate 705 into the water 703 in the absence of the liquid draw venturi device 722 as the mixer 720.

The diluted concentrate or pre-infused beverage 706 can flow through a second mixer 730 that can be referred to as an infusion module 732. The infusion module module 732 can be provided as an earlier described infusion module, but in that case, there would need to be pressurized nitrogen containing gas for introduction into the infusion module 732. Alternatively, and as illustrated in FIG. 8, the infusion module 732 can be referred to as a gas draw venturi device 734. The gas draw infusion device 734 can function similarly to the liquid draw venturi device 722 except that a gas is drawn into the flowing diluted concentrate or pre-infused beverage 706 at or near the location of the restriction. As a result of the use of the gas draw venturi device 734, the nitrogen containing gas 740 can be drawn from atmospheric pressure. The advantage of this is that it is possible to avoid the use of a compressor to compress the air, and the nitrogen containing gas is simply drawn from the ambient air. Furthermore, a compressor can be used, if desired, to facilitate introduction of the nitrogen containing gas into the diluted concentrate or pre-infused beverage 706. Accordingly, compressed gas, such as air, can be introduced into the diluted concentrate or pre-infused beverage 706 through the gas draw venturi device 734 to help with the infusion of the gas. It should be appreciated, however, that it is advantageous to avoid having to use a compressor in order to infuse the nitrogen containing gas into the diluted concentrate or pre-infused beverage 706.

Furthermore, although it is preferred to not use compressed gas, it is possible to include a compressed gas such as nitrous oxide and introduce it into the diluted concentrate or pre-infused beverage 706 to provide a desired texture or effect for the resulting gas-infused beverage 708. It should be appreciated that nitrous oxide can be considered a type of nitrogen containing gas, and the nitrous oxide can be used in combination or in place of gas from ambient atmosphere.

Gas at atmospheric pressure 742 can pass through a filter 744, such as a sanitary filter, and can pass through an optional throttle valve 746 to control the flow rate of the nitrogen containing gas, and through a check valve 748 to reduce backflow. The resulting nitrogen containing gas 740 can then be introduced into the diluted concentrate or pre-infused beverage 706. The gas at atmospheric pressure 742 can be provided as ambient air, and it can also be provided as ambient air with desired flavors or smells. For example, the gas can be air with smoke, diffused oils, essences, and various vapors that can impart a flavor or scent, or nutritional or medicinal benefit, to the resulting gas-infused beverage. As discussed previously, an advantage of using ambient air is that the air contains a high level of nitrogen gas, and because the air is used relatively immediately in forming the gas-infused beverage 708, there is no time for the oxygen to have a significant oxidizing effect.

A dispensing valve or tap 750 can be used for dispensing the gas-infused beverage 708. A pressure switch 752 can be located upstream of the dispensing valve 750, and the pressure switch 752 can be used to signal the solenoid 712 and/or the pump 726 to turn on or turn off depending on the signal. The pressure switch 752 can be located at various locations throughout the beverage infusion apparatus 700 including between the first mixer 720 and the second mixer 730.

Multiple lines can branch off from the pressurized water source 702 to provide multiple mixing lines for different gas-infused beverages. For example, possible branch points are illustrated at branch points 780 and 782.

Figure 9:
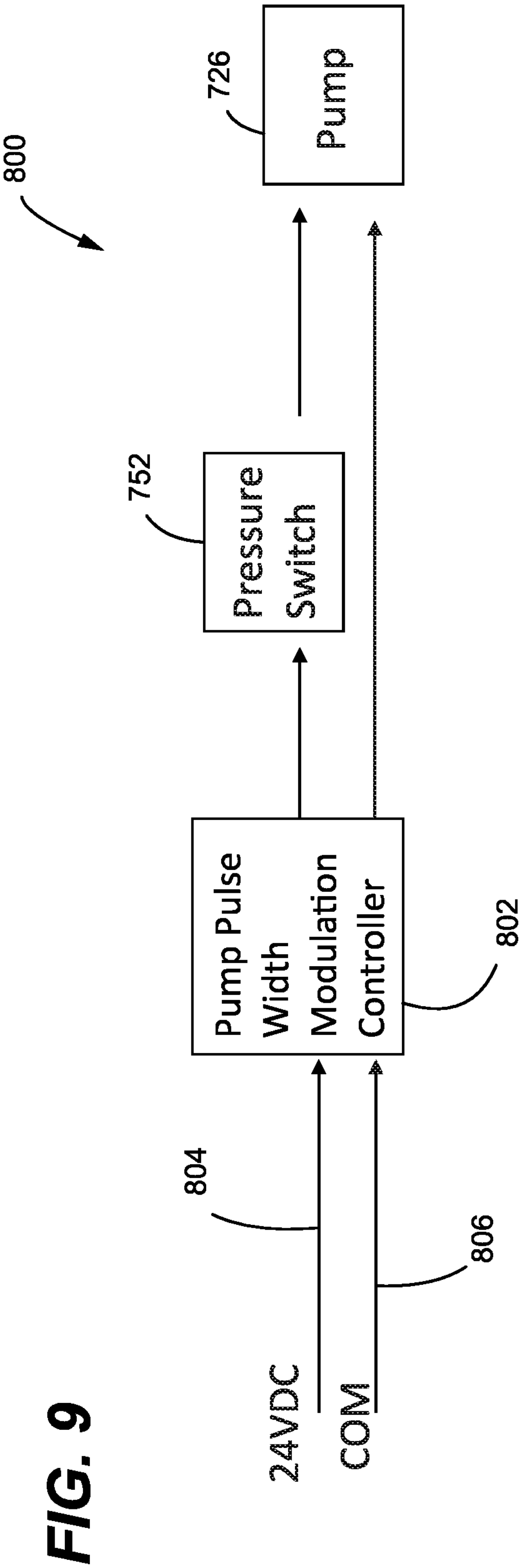
FIG. 9 is a schematic representation illustrating pump control for the beverage infusion apparatus of FIG. 8.

Now referring to FIG. 9, and alternative control system is illustrated at reference number 800. The control system 800 can be used in combination with the pressure switch 752 and the pump 726. A controller 802 powered by a power source 804 such as 24 V DC and a communication link 806 can regulate and control the pump 726 using the pressure switch 752. This type of control can be used without a micro controller during as an alternative to the pressure switch 752, it would be possible to detect the direct mechanical movement of the dispensing valve 750 to provide input for controlling the pump 726.

Figure 10A:
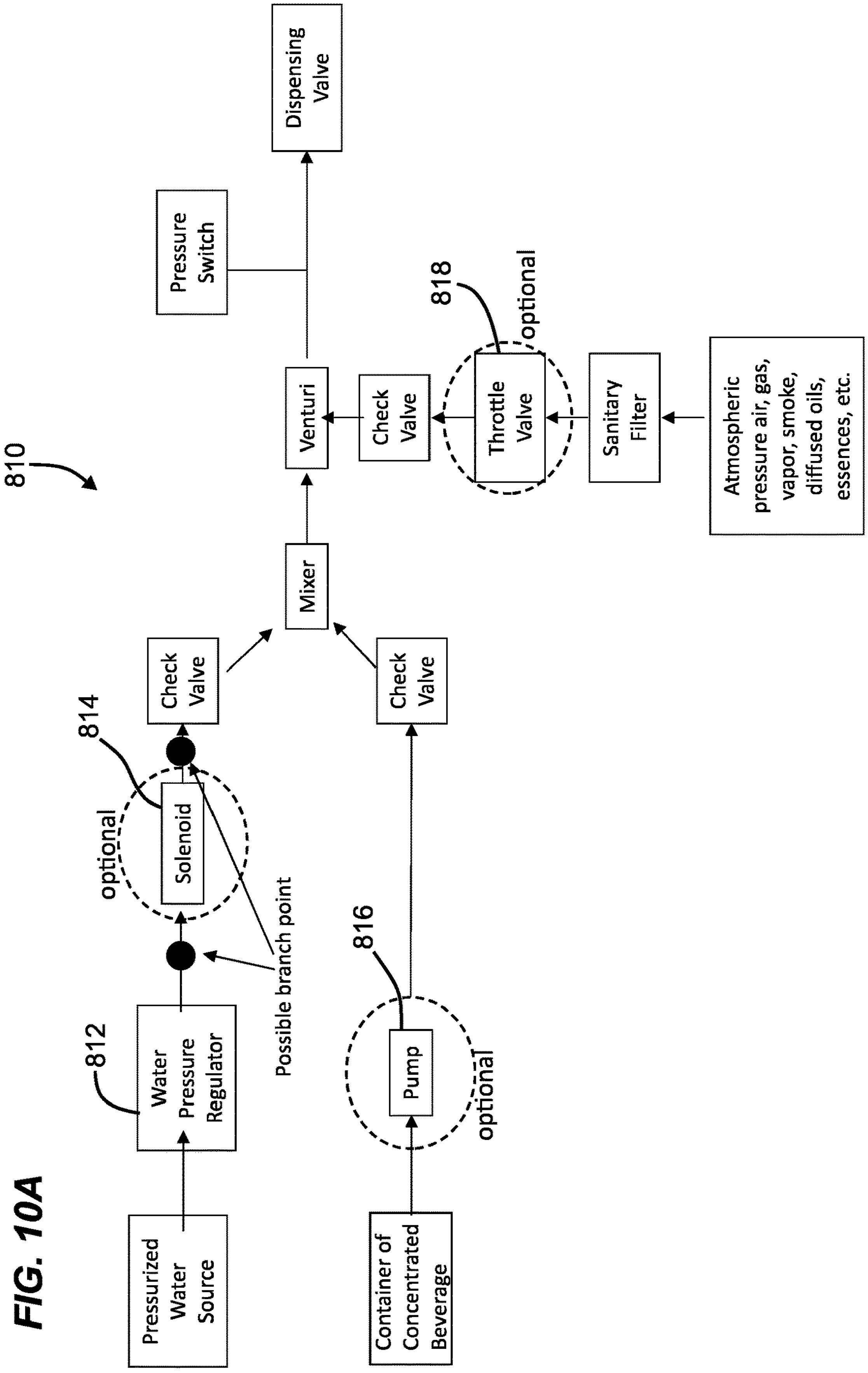
FIGS. 10A-10C are schematic representations illustrating alternative beverage infusion apparatus and flow through the beverage infusion apparatus according to the present disclosure.
Figure 10B:
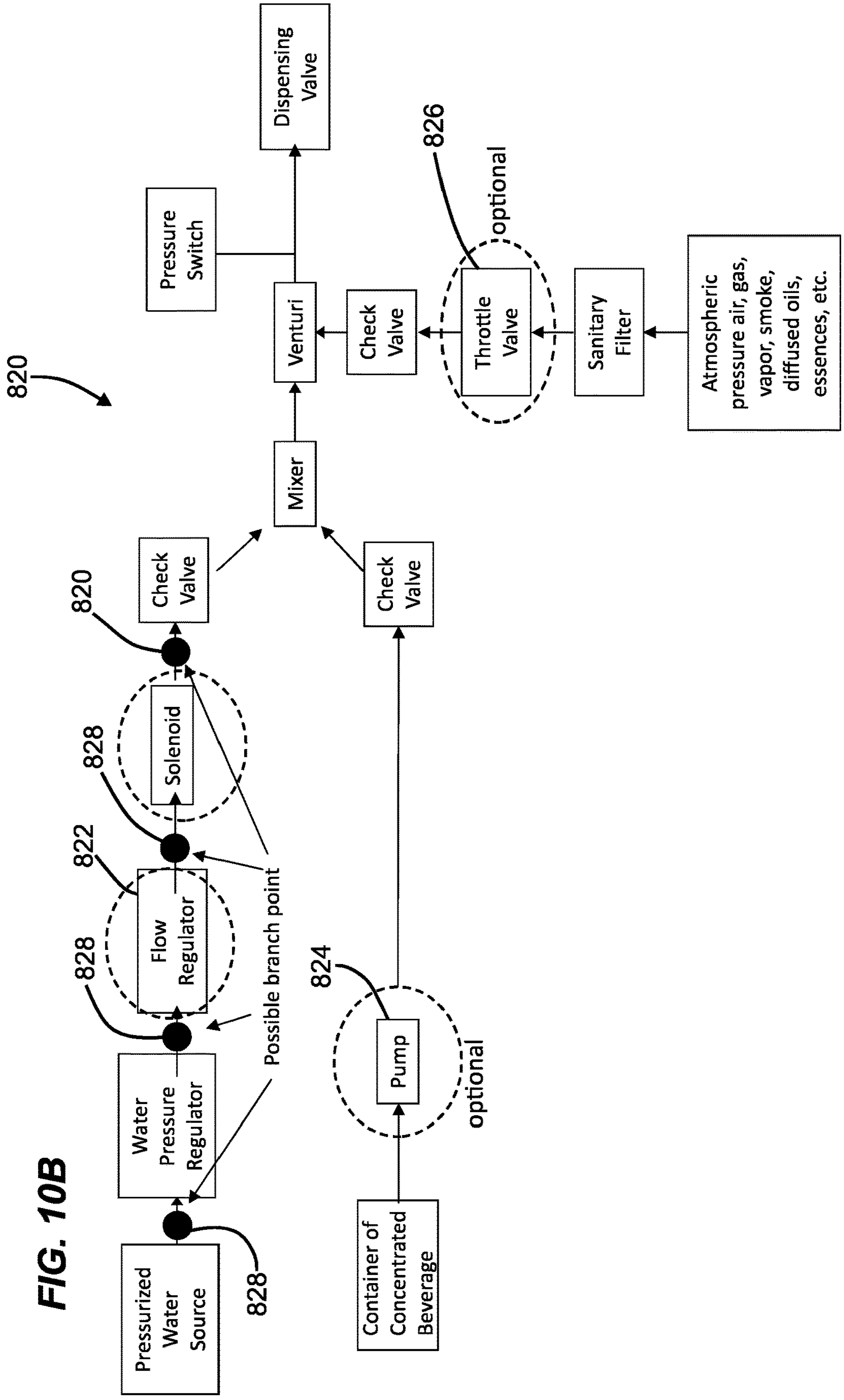
Figure 10C:
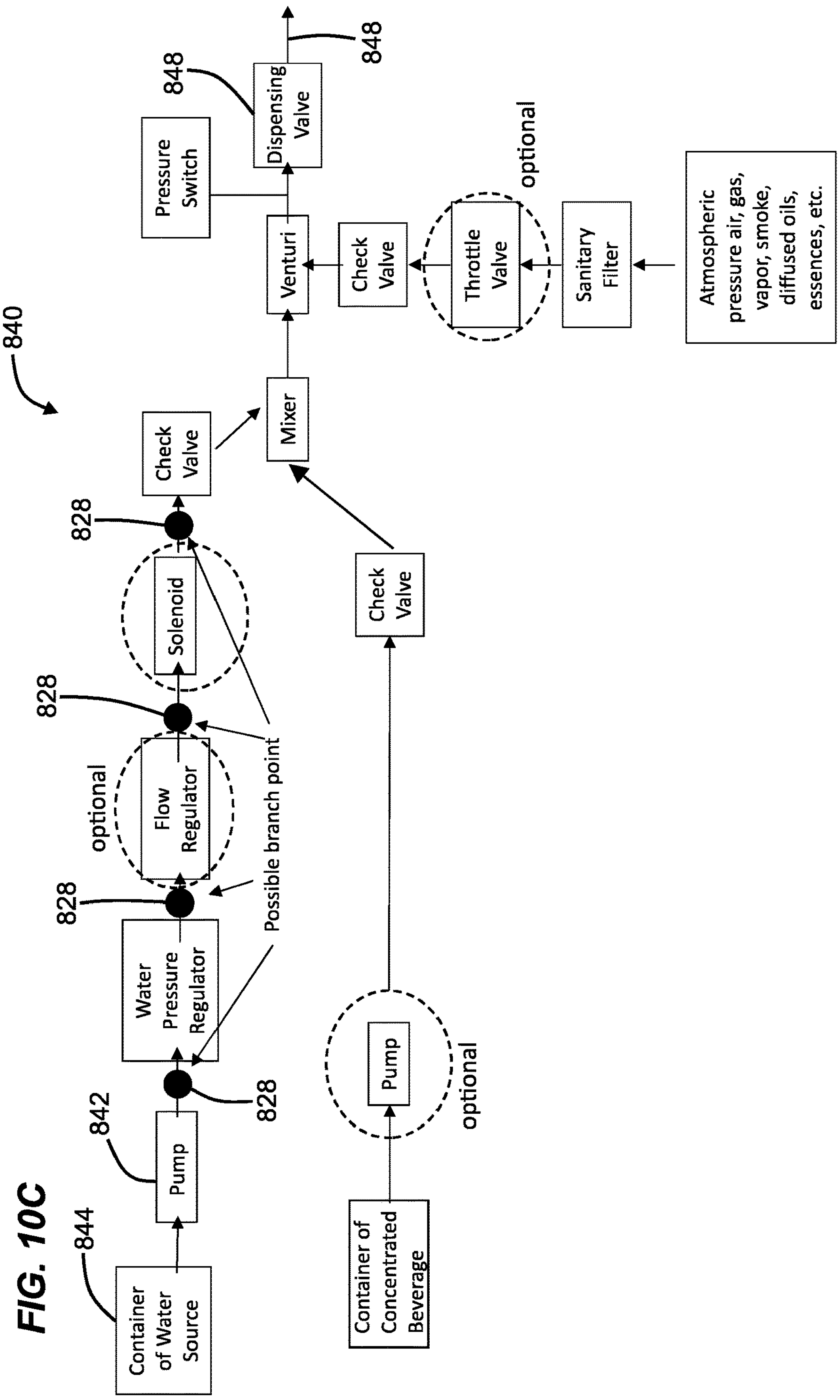

Now referring to FIGS. 10A-10C, alternative schematic diagrams showing operation of the beverage infusion apparatus is illustrated. FIG. 10A illustrates a beverage infusion apparatus 810 that is similar to the beverage infusion apparatus 700 illustrated in FIG. 8 except that it includes a pressure regulator 812. In addition, the solenoid 814, the pump 816, and the throttle valve 818 are characterized as optional. Accordingly, the same reference numbers and descriptions from FIG. 8 can be applied to FIG. 10A. FIG. 10B shows an alternative beverage infusion apparatus 820 that is similar to the beverage infusion apparatus 810 of FIG. 10A except that it includes a flow regulator 822. In this design, the flow regulator 822, the pump 824, and the throttle valve 826 are optional, and there are several identified possible branch points 828 for multiple mixing lines for different gas-infused beverages. FIG. 10C shows an alternative beverage infusion apparatus 840 that is similar to the beverage infusion apparatus 820 of FIG. 10B except that it includes a pump 842 for delivering a water source 844 that may not be under sufficient pressure to flow through the beverage infusion apparatus 840 without additional pressure. The source of water 844 can be available as a manufactured product for consumption as discussed previously, and can be available in a container. Accordingly, the pump 842 delivers the source of water 844 at a pressure sufficient to operate the apparatus 840 to provide a gas infused beverage 846 from the dispensing valve 848.

Figure 11A:
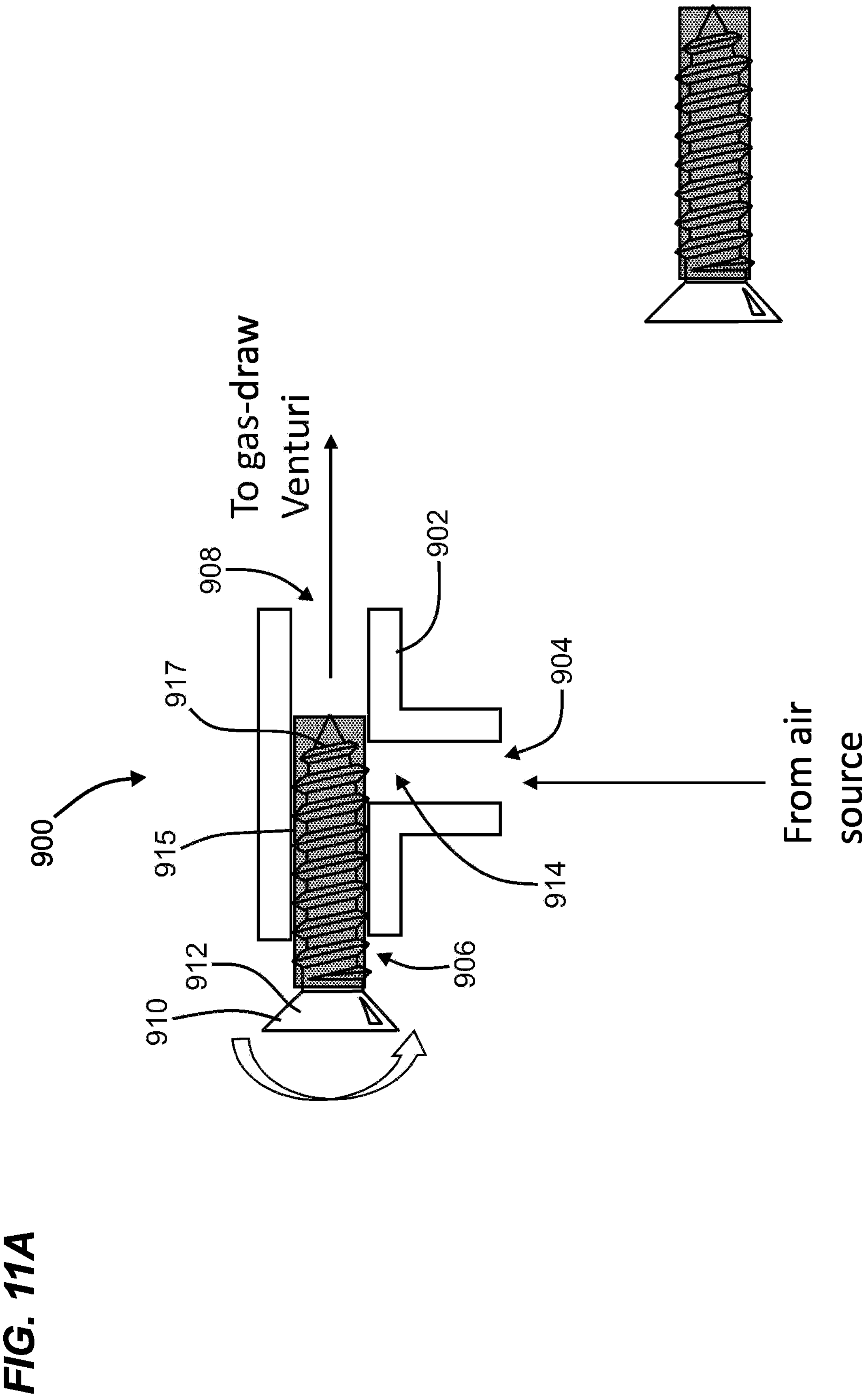
FIGS. 11A and 11B illustrate exemplary and alternative throttle valve devices.
Figure 11B:
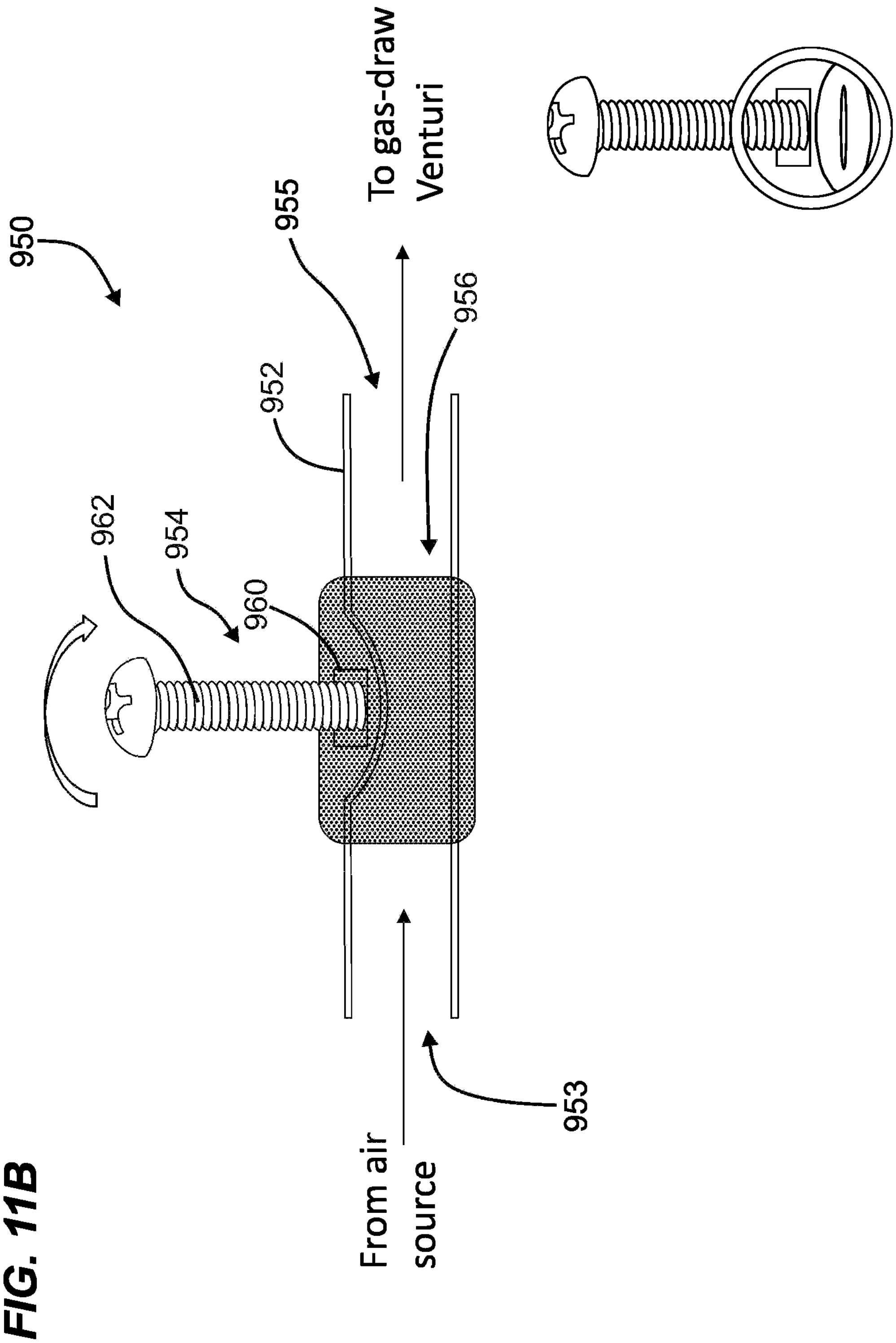

Referring to FIGS. 11A and 11B, exemplary throttle valves for adjusting and controlling flow of gas into the gas draw venturi device are depicted at reference numbers 900 and 950. In FIG. 11A, the throttle valve 900 includes a T fitting 902 having a gas inlet 904 for receiving incoming gas, a fastener inlet 906, and a gas outlet 908 for outlet gas to the gas draw venturi device, and a fastener 910 located in the fastener inlet 906. The particular fastener 910 illustrated is a screw fastener 912 and can be rotated one way to decrease flow through the T fitting 902 and rotated the other way to increase flow through the T fitting 902. The T fitting 902 can be provided as a relatively rigid material, and it is the internal space 914 that is either allowed to increase or decrease as the fastener 912 moves to into or out of the internal space 914. A polymeric coating 915 can be provided covering the threads 917 on the fastener 910 to provide a seal between the fastener 910 and the fitting 902.

In FIG. 11B, the throttle valve 950 similarly adjusts flow of gas into the gas draw venturi device. The throttle valve 950 includes tubing 952 and a screw adjuster 954. The tubing 952 can be sufficiently flexible so that the screw adjuster 954 can compress the tubing 952. Gas flow through the tubing 952 from a gas inlet 953 to a gas outlet 955. As the tubing 952 is compressed, the internal space 956 is reduced thereby decreasing flow through the throttle valve 950. The screw adjuster 952 includes a fixture 960 that holds a screw member 962 relative to the tubing 952. Thus, rotation of the screw member 962 in one direction results in depressing the tubing 952 to reduce the internal space 956 to thereby reduce flow to the gas draw venturi, and rotation of the screw member 962 in the opposite direction results is increased flow to the gas draw venturi device by opening the internal space 052.

It should be appreciated that the throttle valves 950 and 952 are exemplary and alternative throttle valves can be used to control the flow of gas to the gas draw venturi device.

Further Alternative Beverage Infusion Apparatuses

Figure 12A:
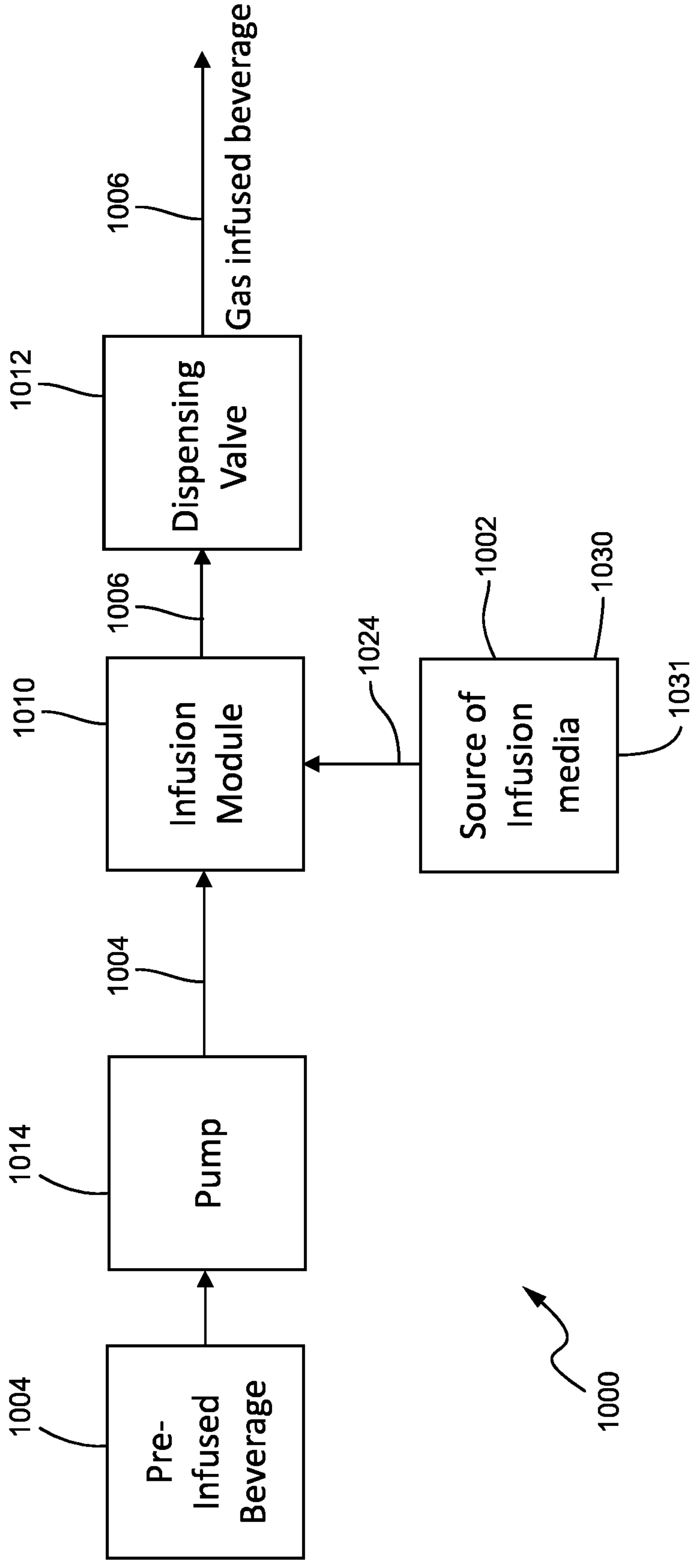
FIGS. 12A and 12B are schematic representations illustrating an alternative beverage infusion apparatus according to the present disclosure.
Figure 12B:
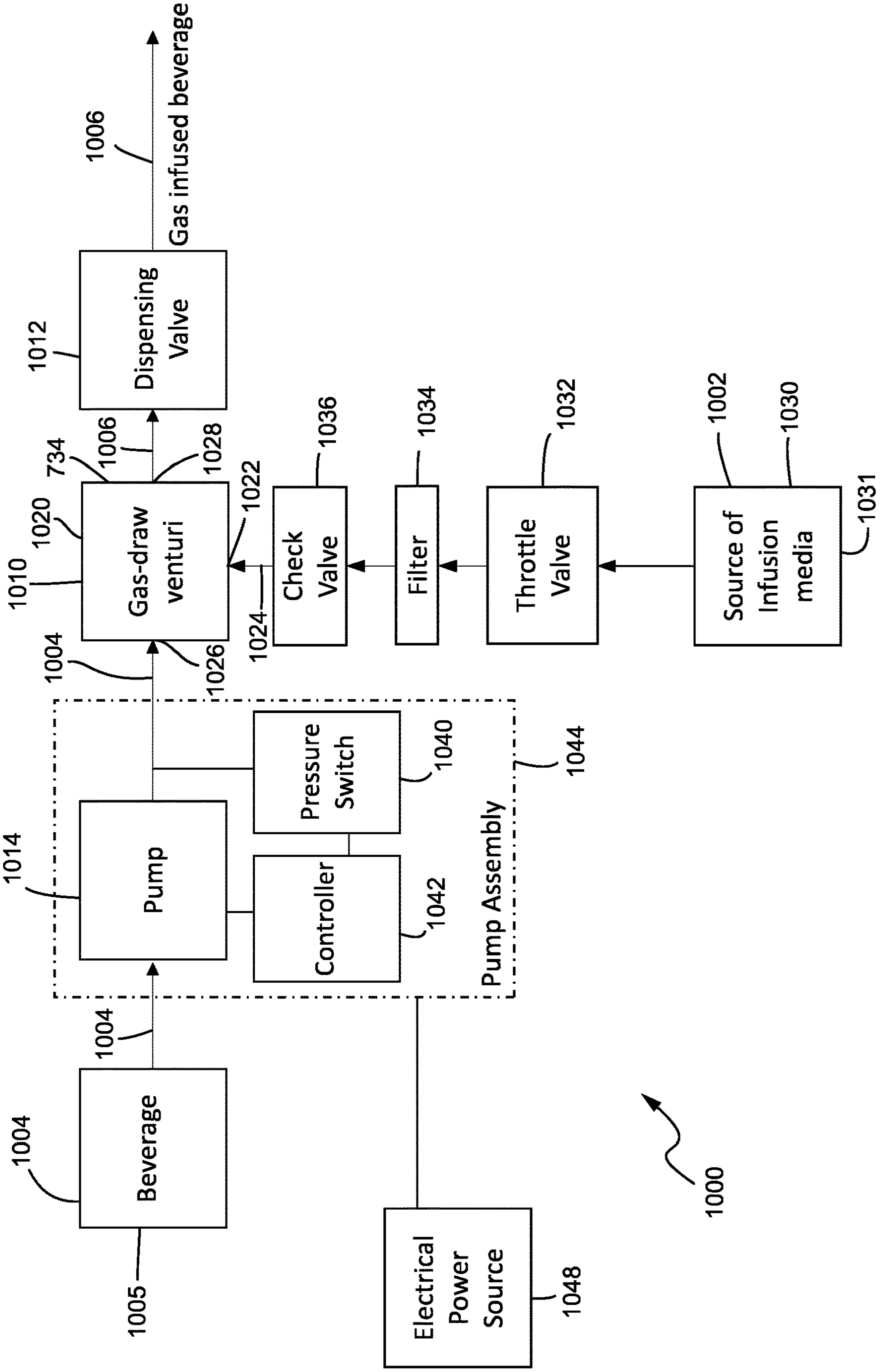

Now referring to FIGS. 12A and 12B, an alternative beverage infusion apparatus is illustrated at reference number 1000 showing a method of infusing a gas 1002 into a beverage 1004 to form a gas infused beverage 1006. The beverage infusion apparatus 1000 includes an infusion module 1010, a dispensing valve 1012, and a pump 1014 for delivering the beverage 1004 through the infusion module 1010 and to the dispensing valve 1012 for dispensing the gas infused beverage 1006. The beverage 1004 can be provided as a non-gas infused beverage which means that it does not have an excess of gas dispersed therein that causes a froth or foam to form, or bubbles that come out of the beverage. Exemplary beverages include, as discussed previously, various type of coffee and tea beverages at any desired temperature. In general, the beverage can be considered a flat beverage when there is a lack of gas infused therein. Of course, there can be some dissolved gas in the beverage, but it can also generally be considered flat when there is not sufficient dissolved gas bubbles to provide a taste or mouth feel consistent with a gas infused beverage. It is the beverage infusion apparatus 1000 that can cause a flat beverage to become a bubbly or gas infused beverage.

In general, it is expected that the beverage 1004 will be provided in a container 1005 that is replaced once it is exhausted or emptied. Alternatively, the beverage 1004 can be manufactured or prepared on site and then added to the container 1005 from which it is withdrawn. The beverage can be any beverage that would benefit from infusion with a nitrogen containing gas. Exemplary beverages include coffees and teas, and can also be alcohol containing beverage such as beer, wine, and cocktails. The container 1005 can be referred to as a beverage reservoir.

The infusion module 1010 can be provided as a gas draw venturi 1020. The gas draw venture 1020 can be similar to the gas draw venturi 734. The gas draw venturi 1020 includes a gas inlet 1022 for flow of a nitrogen containing gas 1024 into the gas draw venturi 1020, a beverage inlet 1026 for flow of the beverage 1004 into the gas draw venturi 1020, and a gas infused beverage outlet 1028 for flow of the gas infused beverage 1006 out of the gas draw venturi 1020. During operation, the beverage 1004 flows into the gas draw venturi 1020 under a flow rate and pressure determined by the operation of the pump 1014, and the restriction inside the gas draw venturi 1020 causes the nitrogen containing gas 1024 to become drawn into the beverage 1004 thereby forming the gas infused beverage 1006 that then exits via the gas infused beverage outlet 1028 and is dispensed via the dispensing valve 1012. Preferably, the beverage 1004 flows into the gas draw venturi 1020 at a flow rate of at least 0.5 ounce/second and more preferably at a flow rate of about 0.5 ounce/second to about 3 ounces/second, and more preferably at a flow rate of about 0.8 ounce/second to about 1.5 ounces/second. The pressure of the beverage 1004 into the gas draw venturi 1020 cab be at least 12 psi to provide a desired pressure drop in the gas draw venturi to cause a flow of the nitrogen containing gas into the beverage. The pressure of the beverage 1004 flowing to the gas draw venturi can be about 12 psi to about 40 psi, about 15 psi to about 35 psi, or about 20 psi to about 30 psi. It is noted that the pressure is gauge pressure or pressure above atmospheric pressure. While the desired infusion of nitrogen containing gas into the beverage and the desired dispensing rate of the gas infused beverage 1006 from the dispensing valve 1012 can be achieved utilizing these flow rates and pressures, it should be appreciated that any flow rate and pressure can be utilized that provides a desired gas infused beverage product.

The nitrogen containing gas 1024, at atmospheric or ambient pressure, can be drawn into the beverage 1004 in the gas draw venturi 1020. There is no need to provide the nitrogen containing gas 1024 at a pressure above atmospheric pressure. An advantage of this is that a compressor for compressing the nitrogen containing gas or a vessel containing compressed nitrogen containing gas can be avoided. A problem with existing apparatuses that utilize compressed nitrogen, typically in tanks, is that once the tank is depleted, a new tank needs to be inventoried and then attached to the system to keep operating the apparatus. In such situations, however, it is often difficult or time consuming to recalibrate the apparatus so that it provides the desired level or quantity of nitrogen infused into the beverage. When such a system that utilizes pressurized nitrogen is subject to over pressure, the resulting beverage may be too foamy, and when the system is subject to under pressure, the resulting beverage may be too flat. Regulating the pressure from a tank of pressurized nitrogen to provide the desired flow of nitrogen into the beverage to provide the desired amount of foam can be difficult because many pressure regulators are not able to maintain the exact pressure over a long period of operation. Thus, such systems that utilize pressurized nitrogen can be sensitive to disturbances often due to the inability of the pressure regulator to maintain the exact pressure. Advantageously, the apparatus 1000 avoids the need to utilize a pressure regulator to control the pressure of a nitrogen containing gas being introduced into the gas draw venturi 1020. Of course, it should be appreciated that the apparatus 1000 can be modified to utilize pressurized nitrogen containing gas, if desired. Such a system could utilize pressurized nitrogen through the gas inlet 1022 of the gas draw venturi 1020.

It is pointed out that the system 1000 is very robust in that it is much less sensitive to clogging compared to other apparatuses that utilize a gas infusion stone for introducing pressurized nitrogen into a beverage. For example, in the case of tea, there may be a tendency for the tea to include leaf particles that may clog a gas infusion stone. In contrast, such particulates may be more likely to flow through a venturi without clogging. Furthermore, the apparatus 1000 avoids the expense of utilized tanks of purified nitrogen gas.

The nitrogen containing gas 1024 can be obtained from ambient air 1030 at atmospheric pressure. The ambient air 1030 can pass through an optional throttle valve 1032 to control flow rate of the ambient air 1030, and can flow through a filter 1034 to remove impurities. The filter 1034 can be provided as a sanitary filter. Furthermore, the filter 1034 and the throttle valve 1032 can be arranged so that the filter 1034 is upstream of the throttle valve 1032. A check valve 1036 can be provided to reduce backflow and prevent flow of beverage through the gas inlet 1022. The ambient air 1030 then becomes the nitrogen containing gas 1024. Advantageously, the nitrogen containing gas be obtained from the ambient air 1030 without altering the ratio of nitrogen to oxygen. It should be understood, however, that the ambient air 1030 can be provided with desired flavors or smells. For example, the ambient air 1030 can be provided with infusion media 1031 that can impart a flavor or scent or nutritional benefit or medicinal benefit to the beverage. Exemplary infusion media includes smoke, diffused or vaporized oils, essences, and various vapors that can impart a flavor or scent, or nutritional benefit or medicinal benefit, to the resulting gas-infused beverage. As discussed previously, an advantage of using ambient air is that the air contains a high level of nitrogen gas, and because the air is used relatively immediately in forming the gas infused beverage 1006, there is no time for the oxygen to have a significant oxidizing effect on the beverage to adversely effect the taste of the beverag. An advantage of the apparatus 1000 is the ability to utilize air as the nitrogen containing gas 1024 rather than utilizing purified nitrogen gas which can be expensive and requires inventorying tanks of the nitrogen gas.

The dispensing valve or tap 1012 can be used for dispensing the gas infused beverage 1006. A pressure switch 1040 can be located upstream of the dispensing valve 1012, and the pressure switch 1040 can be used to signal the pump 1014 to turn on or turn off depending on the signal. The pressure switch 1040 can be located at various locations throughout the beverage infusion apparatus 1000. Of course, the pressure switch 1040 can be located downstream of the pump 1014 to monitor the pressure condition of the beverage downstream of the pump 1014. If desired, the apparatus 1000 can include a controller 1042 for receiving a signal from the pressure switch 1040 and then controlling whether the pump 1014 turns on or off. Optionally, the controller 1042 can also control whether the pump speed and pressure require adjustment. As illustrated in FIG. 12B, the pressure switch 1040 and the controller are located as part of the pump assembly 1044 that includes the pump 1014, the pressure switch 1040, and the controller 1042. Such pump assemblies are commercially available, and can be powered by an electrical power source 1048. Exemplary pumps that can be utilized include diaphragm pumps, centrifugal pumps, and positive displacement pumps.

The apparatus 1000 can be located in a refrigeration unit such as a refrigerator. This would be advantageous when the beverage 1004 is refrigerated and it is desirable for the resulted gas infused beverage to be cold or otherwise below ambient or room temperature.

Figure 13:
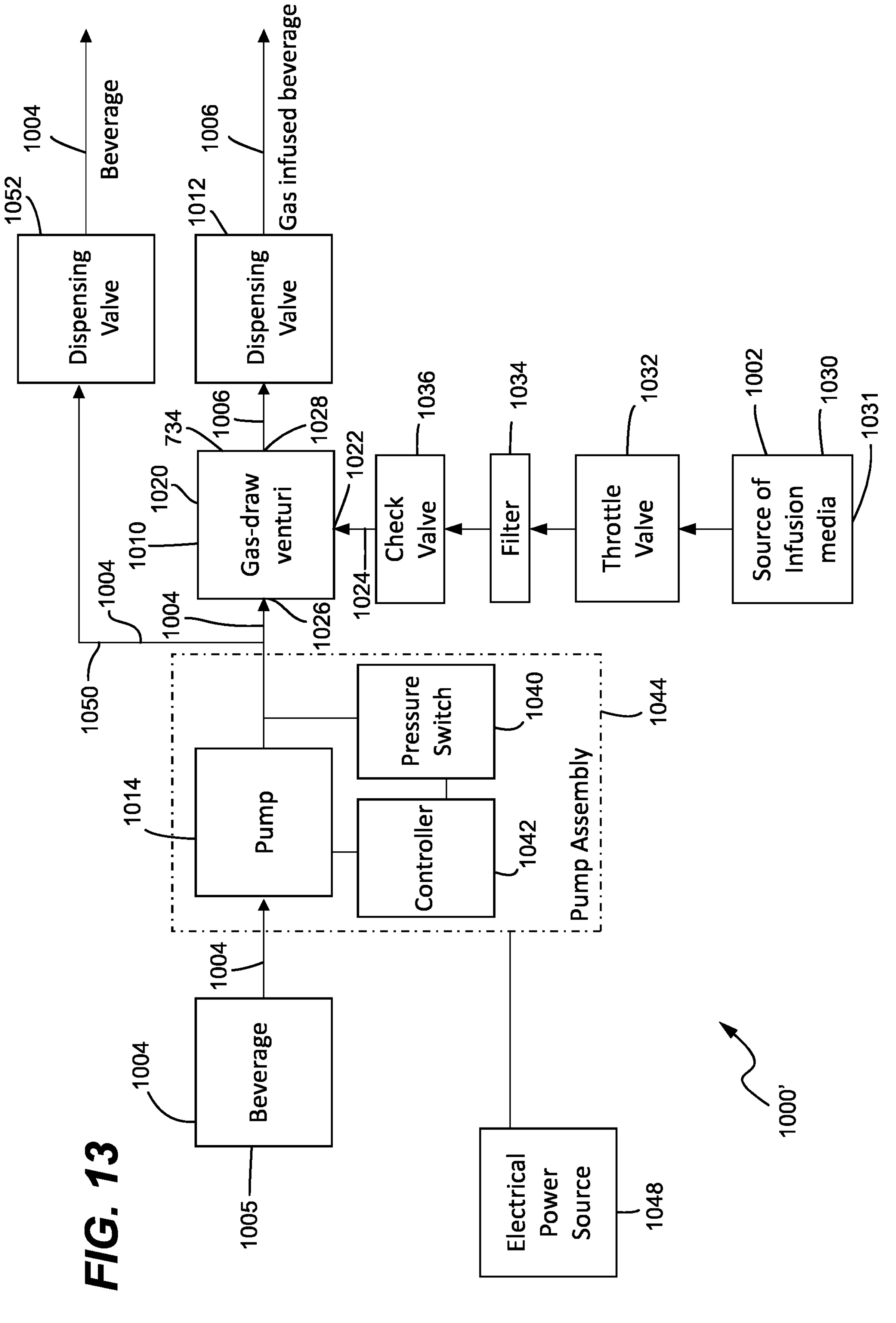
FIG. 13 is a schematic representation illustrating an alternative beverage infusion apparatus according to the present disclosure.

Now referring to FIG. 13, an alternative beverage infusion apparatus is illustrated at reference number 1000'. The apparatus 1000' is similar to the apparatus 1000 in FIG. 12B except that it includes a beverage dispensing line 1050 for dispensing of the beverage 1004 which may be referred to as non-gas infused beverage because it does not pass through the infusion module 1010 for nitrogen containing gas infusion therein. The beverage dispensing line 1050 includes a dispensing valve or tap 1052 for dispensing of the beverage 1004 from the apparatus 1000'. Similar to the operation of the apparatus 1000 in FIG. 12B, opening the dispensing valve or tap 1012 causes a pressure drop that is sensed by the pressure switch 1040 and that in turn causes the pump 1014 to turn on and pump the beverage 1004 through the system and in particular through the infusion module 1010. Similarly, opening the dispensing valve or tap 1052 creates a low pressure situation that is sensed by the pressure switch 1040 that causes the pump 1014 to pump beverage through the dispensing valve 1052. Once both dispensing valves 1012 and 1052 are closed, a sufficiently high pressure condition exits in the apparatus 1000' which is sensed by the pressure switch 1040 resulting in the pump 1014 turning off. It should be appreciated that the reference to the pump turning off is meant to refer to the pump ceasing to pump or otherwise move the beverage 1004 through the apparatus 1000'. In other words, the pump 1014 can be considered to be activated for pumping or deactivated for pumping. Accordingly, the systems 1000 and 1000' can be operated by the user by simply moving the dispensing valve or tap 1012 or 1052 between open and closed positions.

The above specification provides a complete description of the manufacture and use of the apparatus of the invention. Since many embodiments of the invention can be made without departing from the spirit and scope of the invention, the invention resides in the claims hereinafter appended.

What is claimed is:

1. A beverage infusion apparatus comprising:

(a) an infusion module for infusing a nitrogen containing gas into a non-gas infused beverage to form a gas infused beverage, wherein:
  (i) the infusion module comprises a gas draw venturi device for drawing the nitrogen containing gas into the non-gas infused beverage as a result of flow of the beverage through the gas draw venturi device to form the gas infused beverage;
  (ii) the gas draw venturi comprises a non-gas infused beverage inlet, a gas infused beverage outlet, a constriction between the non-gas infused beverage inlet and the gas infused beverage outlet, and a nitrogen containing gas inlet;
  (iii) the gas draw venturi is constructed to draw the nitrogen containing gas at atmospheric pressure into the non-gas infused beverage; and
  (iv) the gas draw venturi comprises a gas inlet, and the apparatus further comprises a check valve up stream of the gas inlet for preventing back flow of the non-gas infused beverage or the gas infused beverage out the gas inlet;

(b) a dispensing valve for dispensing the gas infused beverage and constructed to move between an open position and a closed position, wherein:
  (i) the open position permits dispensing of the gas infused beverage from the beverage infusion apparatus;
  (ii) the closed position prevents dispensing of the gas infused beverage from the beverage infusion apparatus; and
  (iii) the dispensing valve is constructed to move between the open position and the closed position by a user of the beverage infusion apparatus; and
  (iv) the dispensing valve is downstream of the gas draw venturi; and (c) a pump constructed to move the non-gas infused beverage at a flow rate of about 0.5 ounce/second to about 3 ounce/second and at a pressure of about 12 psi to about 40 psi through the infusion module and to the dispensing valve, when the dispensing valve is provided in the open position, the pump further comprising:
  (i) a pressure sensor for sensing a decrease in pressure resulting from the dispensing valve being moved to the open position, and an increase in pressure resulting from the dispensing valve being moved to the closed position, wherein the pressure sensor is located downstream from the pump; and
  (ii) a controller for controlling operation of the pump based on the pressure sensor sensing the decrease in pressure and the increase in pressure.

2. A beverage infusion apparatus according to claim 1 wherein:

(a) the nitrogen containing gas comprises atmospheric air comprising ambient amounts of nitrogen and oxygen found in atmospheric air.

3. A beverage infusion apparatus according to claim 2 wherein:

(a) the amounts of nitrogen and oxygen found in the nitrogen containing gas comprises at least about 20% oxygen and at least about 78% nitrogen.

4. A beverage infusion apparatus according to claim 1, further comprising:

(a) a filter for filtering the nitrogen containing gas to remove impurities.

5. A beverage infusion apparatus according to claim 1, further comprising:

(a) a source of infusion media for addition to the nitrogen containing gas.

6. A beverage infusion apparatus according to claim 5 wherein:

(a) the source of infusion media comprises odiferous materials.

7. A beverage infusion apparatus according to claim 1, further comprising:

(a) a mixer for mixing a beverage concentrate and water to form the non-gas infused beverage.

8. A beverage infusion apparatus according to claim 7 wherein:

(a) the mixer comprises a static mixer.

9. A beverage infusion apparatus according to claim 7, further comprising:

(a) a water pressure regulator for regulating the water pressure and flow rate of the water to the mixer.

10. A beverage infusion apparatus according to claim 7 wherein:

(a) the mixer further comprises a liquid draw venturi device that draws the beverage concentrate into the source of water as the source of water flows through the liquid draw venturi device.

11. A beverage infusion apparatus comprising:

(a) an infusion module for infusing a nitrogen containing gas into a non-gas infused beverage to form a gas infused beverage, wherein:

(i) the infusion module comprises a gas draw venturi device for drawing the nitrogen containing gas into the non-gas infused beverage as a result of flow of the beverage through the gas draw venturi device to form the gas infused beverage;

(ii) the gas draw venturi comprises a non-gas infused beverage inlet, a gas infused beverage outlet, a constriction between the non-gas infused beverage inlet and the gas infused beverage outlet, and a nitrogen containing gas inlet;

(iii) the gas draw venturi is constructed to draw the nitrogen containing gas at atmospheric pressure into the non-gas infused beverage; and (iv) the gas draw venturi comprises a gas inlet, and the apparatus further comprises a check valve up stream of the gas inlet for preventing back flow of the non-gas infused beverage or the gas infused beverage out the gas inlet;

(b) a mixer for mixing a beverage concentrate and water to form the non-gas infused beverage, (c) a dispensing valve for dispensing the gas infused beverage and constructed to move between an open position and a closed position, wherein:

(i) the open position permits dispensing of the gas infused beverage from the beverage infusion apparatus;

(ii) the closed position prevents dispensing of the gas infused beverage from the beverage infusion apparatus; and (iii) the dispensing valve is constructed to move between the open position and the closed position by a user of the beverage infusion apparatus; and (iv) the dispensing valve is downstream of the gas draw venturi; and (d) a pump constructed to move the non-gas infused beverage, under pressure, through the infusion module and to the dispensing valve, when the dispensing valve is provided in the open position, the pump further comprising:

(i) a pressure sensor for sensing a decrease in pressure resulting from the dispensing valve being moved to the open position, and an increase in pressure resulting from the dispensing valve being moved to the closed position, wherein the pressure sensor is located downstream from the pump; and (ii) a controller for controlling operation of the pump based on the pressure sensor sensing the decrease in pressure and the increase in pressure.

12. A beverage infusion apparatus according to claim 11 wherein:

(a) the nitrogen containing gas comprises atmospheric air comprising ambient amounts of nitrogen and oxygen found in atmospheric air.

13. A beverage infusion apparatus according to claim 12 wherein:

(a) the amounts of nitrogen and oxygen found in the nitrogen containing gas comprises at least about 20% oxygen and at least about 78% nitrogen.

14. A beverage infusion apparatus according to claim 11, further comprising:

(a) a filter for filtering the nitrogen containing gas to remove impurities.

15. A beverage infusion apparatus according to claim 11, further comprising:

(a) a source of infusion media for addition to the nitrogen containing gas.

16. A beverage infusion apparatus according to claim 15 wherein:

(a) the source of infusion media comprises odiferous materials.

17. A beverage infusion apparatus according to claim 11 wherein:

(a) the mixer comprises a static mixer.

18. A beverage infusion apparatus according to claim 11, further comprising:

(a) a water pressure regulator for regulating the water pressure and flow rate of the water to the mixer.

19. A method of forming a gas infused beverage at a location of purchase of the gas infused beverage, the method comprising:

(a) infusing a nitrogen containing gas into a non-gas infused beverage to form a gas infused beverage, wherein the non-gas infused beverage flows through a gas draw venturi, wherein the gas draw venturi comprises a non-gas infused beverage inlet, a gas infused beverage outlet, a constriction provided between the non-gas infused beverage inlet and the gas infused beverage outlet, and a nitrogen containing gas inlet, wherein the step of infusing the nitrogen containing gas into the beverage comprises drawing the nitrogen containing gas through the nitrogen containing gas inlet and into the non-gas infused beverage to form the gas infused beverage, wherein:

(i) the beverage flows at a flow rate of about 0.5 ounce/second to about 3 ounces/second and under a pressure of about 12 psi to about 40 psi to the gas draw venturi; and (ii) the nitrogen containing gas is provided at atmospheric pressure to the nitrogen containing gas inlet; and (iii) the nitrogen containing gas is provided with a flavor, scent, nutritional benefit, or medicinal benefit;

(b) dispensing the gas infused beverage by moving a dispensing valve from a closed position to an open position, wherein:

(i) the open position permits dispensing of the gas infused beverage; and (ii) the closed position prevents dispensing of the gas infused beverage;

wherein the nitrogen containing gas comprises at least 10% oxygen;

(ii) the dispensing valve is downstream of the gas draw venturi.

20. A method according to claim 19 wherein:

(a) the beverage comprises a beverage resulting from extraction.

21. A method according to claim 19 wherein:

(a) the beverage resulting from extraction comprises a coffee beverage or a tea beverage.

22. A method according to claim 19 wherein:
(a) the nitrogen containing gas comprises ambient amounts of nitrogen and oxygen found in atmospheric air.

23. A method according to claim 19 further comprising:
(a) filtering the nitrogen containing gas prior to infusing the nitrogen containing gas into a beverage.

24. A method according to claim 19 wherein:
(a) the nitrogen containing gas comprises at least about 20% oxygen and at least about 78% nitrogen.

25. A method according to claim 19, further comprising:
(a) purchasing the gas infused beverage in a condition ready for immediate consumption at a retail facility where the non-gas infused beverage was infused with the nitrogen containing gas.

26. A method according to claim 19 wherein:
(a) the step of infusing the nitrogen containing gas into the non-gas infused beverage comprises drawing the nitrogen containing gas into the non-gas infused beverage at the constriction to form the gas infused beverage.

* * * * *